(12) United States Patent
Shelton et al.

(10) Patent No.: US 9,866,426 B2
(45) Date of Patent: *Jan. 9, 2018

(54) METHODS AND APPARATUS FOR ANALYZING SYSTEM EVENTS

(71) Applicant: HAWK Network Defense Inc., Dallas, TX (US)

(72) Inventors: Tim Shelton, Plano, TX (US); David Harris, Southlake, TX (US); Todd Jason Wheeler, Jr., Farmers Branch, TX (US)

(73) Assignee: HAWK NETWORK DEFENSE, INC., Dallas, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/613,159

(22) Filed: Feb. 3, 2015

(65) Prior Publication Data
US 2015/0213358 A1     Jul. 30, 2015

Related U.S. Application Data

(63) Continuation-in-part of application No. 13/552,600, filed on Jul. 18, 2012, now Pat. No. 8,949,169, which
(Continued)

(51) Int. Cl.
*G06F 17/00* (2006.01)
*G06N 5/02* (2006.01)
(Continued)

(52) U.S. Cl.
CPC ...... *H04L 41/0604* (2013.01); *H04L 41/0631* (2013.01); *H04L 41/0636* (2013.01);
(Continued)

(58) Field of Classification Search
USPC .......................................................... 706/47
See application file for complete search history.

(56) References Cited

U.S. PATENT DOCUMENTS 6,239,622 B1 *  5/2001  Harris ................ H03K 19/0966
                                                                  326/121
6,708,185 B2 *  3/2004  Harris ............... G06F 17/30306
(Continued)

OTHER PUBLICATIONS

High-performance nested CEP query processing over event streams Mo Liu; Elke Rundensteiner; Dan Dougherty; Chetan Gupta; Song Wang; Ismail Ari; Abhay Mehta 2011 IEEE 27th International Conference on Data Engineering Year: 2011 pp. 123-134 IEEE Conference Publications.*

(Continued)

*Primary Examiner* — Michael B Holmes
(74) *Attorney, Agent, or Firm* — Loza & Loza, LLP; Patrick Law

(57) ABSTRACT

Apparatus and methods facilitate analysis of events associated with network and computer systems. Event data, such as security threats, are comparison matched with event rules of event rule sets associated with each network or computer system to determine whether the items are potentially significant. Additionally, the system-event data may be scored where the score is used for prioritizing system-event data as to their significance. Associated with the comparison matching are various analytics that further analyze event data for measuring and analyzing the system-event data according to various algorithms.

20 Claims, 25 Drawing Sheets

Related U.S. Application Data is a continuation-in-part of application No. 12/947,626, filed on Nov. 16, 2010, now Pat. No. 8,560,481.

(60) Provisional application No. 61/261,959, filed on Nov. 17, 2009.

(51) Int. Cl.
*H04L 12/24* (2006.01)
*H04L 29/06* (2006.01)
*H04L 29/08* (2006.01)
*H04L 12/26* (2006.01)

(52) U.S. Cl.
CPC .......... *H04L 63/1408* (2013.01); *H04L 63/20* (2013.01); *H04L 41/145* (2013.01); *H04L 43/026* (2013.01); *H04L 67/30* (2013.01)

(56) References Cited

U.S. PATENT DOCUMENTS

| | | | | |
|---|---|---|---|---|
| 8,560,481 B2* | 10/2013 | Naifeh | ................ | H04L 41/0604 706/47 |
| 8,574,063 B2* | 11/2013 | Harris | ..................... | G07F 17/32 463/16 |
| 8,881,272 B2* | 11/2014 | Bunker | ................. | G06F 21/577 707/957 |
| 8,949,169 B2* | 2/2015 | Shelton | ............... | H04L 41/0604 706/47 |
| 9,039,520 B2* | 5/2015 | Harris | ..................... | G07F 17/32 463/25 |

OTHER PUBLICATIONS

CADRE: continuous analysis and discovery from relational evidence N. Pioch; D. Hunter; C. Fournelle; B. Washburn; K. Moore; E. Jones; D. Bostwick; A. Kao; S. Graham; T. Allen; M. Dunn Integration of Knowledge Intensive Multi-Agent Systems, 2003. International Conference on Year: 2003 pp. 555-561 IEEE Conference Publication.*

A Matching Algorithm Based on Association Rules in Ontology Based Publish/Subscribe System Shufen Liu; Meng Chi; Zhilin Yao Chinese Journal of Electronics Year: 2015, vol. 24, Issue: 1 pp. 65-70 ET Journals & Magazines.*

Tracking the evolution of community structures in time-evolving social networks Etienne Gael Tajeuna; Mohamed Bouguessa; Shengrui Wang 2015 IEEE International Conference on Data Science and Advanced Analytics (DSAA) Year: 2015 pp. 1-10 IEEE Conference Publications.*

* cited by examiner

FIG. 6

Method for Natural Language Processing for Advanced and Automated Log Normalization

METHODS AND APPARATUS FOR ANALYZING SYSTEM EVENTS

CLAIM OF PRIORITY UNDER 35 U.S.C. §120

The present application for patent is a Continuation-in-part of pending patent application Ser. No. 13/552,600, entitled "METHOD AND APPARATUS FOR ANALYZING SYSTEM EVENTS" filed Jul. 18, 2012, which, in turn, was a Continuation-in-Part of patent application Ser. No. 12/947,626 entitled "METHOD AND APPARATUS FOR ANALYZING SYSTEM EVENTS" filed Nov. 16, 2010, now U.S. Pat. No. 8,560,481, which claimed benefit under 35 U.S.C. §119 of Provisional Patent Application No. 61/261,959 filed on Nov. 17, 2009, all of which are hereby expressly incorporated by reference herein.

BACKGROUND

Field

The present disclosure relates generally to analyzing events occurring in systems, such as computer network systems. More particularly, the present disclosure relates to apparatus and methods by which to identify event occurrences, such as intrusion attempts, that are significant, score the identified event occurrences with quantitative scores, and to efficiently store or cache the scores for multiple network systems, such as in a Managed Security Services Provider (MSSP) arrangement monitoring numerous client networks.

Background

Modern computer networks and systems are often times complex. Such systems typically are formed of a set of interacting or interdependent system components that together form and define the system. During system operation, many varied system events occur, both events internal to the system as well as external events that potentially affect and threaten operation of the system. A manager or operator of the system, in order fully to be aware of the system operation should be aware of system-related events, particularly events that might deleteriously affect operation of the system.

In a complex network or system, a large number of events, such as intrusion attempts, might occur daily. Logging of the occurrences of such events, when detected, permits subsequent review of the events by the system manager or operator. At the subsequent review, the system manager or operator is able to then take responsive action. Because of the potentially large number of event occurrences, the log of the event occurrences is potentially very lengthy, and review of the logged event occurrences might well be time-consuming. Furthermore, if a small number of significant event occurrences are interspersed amid a large number of insignificant event occurrences, a reviewer might not properly notice significant event-occurrence entries in the log.

While various mechanisms are available by which to provide for alerts to be generated to highlight selected event-occurrence entries, general review and analysis is still carried out in a conventional, sequential, and iterative manner. Accordingly, an improved manner by which to provide for review and analysis of system-event occurrences would be beneficial. Additionally, if an operator or system manager monitors multiple systems, the multiple log reviews, and redundancy of log entries of system-event occurrences across the multiple monitored systems, adds to the time and complexity of reviewing and analyzing system-event occurrences.

It is in light of the above problems that the presently disclosed methods and apparatus beneficially provide improved system operation and management, particularly for review and analysis of system events across multiple monitored systems or networks.

SUMMARY

The present disclosure provides apparatus and associated methods for analyzing events occurring at a system, such as a computer network system.

According to at least one aspect, a method is disclosed for use in analyzing system events for one or more network systems or computer systems. The method includes identifying system-event data resulting from system or network events occurring on one or more computer systems that match at least one event rule of an event-rule set in the one or more computer systems or network systems. The method further includes normalizing the identified system-event data. Further, the method includes analyzing the system-event data including at least one of (1) determining comparison matching of rules pertaining to the system-event data; (2) using at least a scoring rule of a scoring-rule configured to assign a score to the system-event data, wherein the score is operable for prioritizing system-event data; and (3) performing data measurements based on the system-event data.

According to other aspects apparatus for performing the methods disclosed herein are also disclosed.

BRIEF DESCRIPTION OF THE DRAWINGS

FIG. 6 illustrates an exemplary display generated of an exemplary event including a score associated therewith, generated pursuant to operation of an embodiment of the present invention.

DETAILED DESCRIPTION

Figure 1:
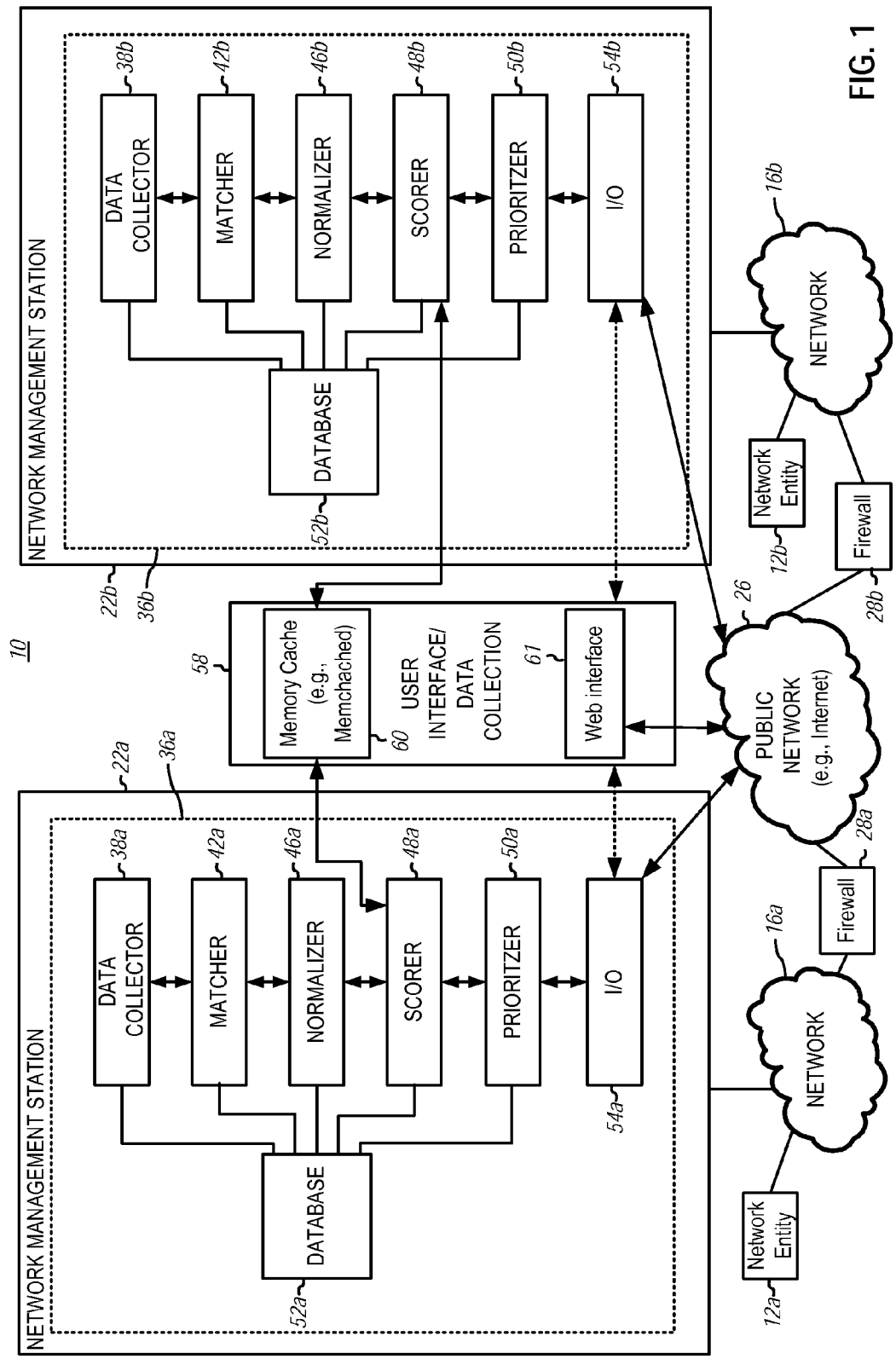
FIG. 1 illustrates a functional block diagram of an exemplary system that includes exemplary apparatus for collecting data across multiple networks.

Referring to FIG. 1, an exemplary system or systems, shown generally at 10, includes one or more entities 12a, 12b, such as work stations or servers, as merely a couple examples, that are communicatively coupled to respective networks 16a, 16b. In the example of FIG. 1, each network 16 may also be communicatively coupled to a management station 22a or 22b configured to monitor and store event-occurrences that may occur in the networks 16a, 16b. The network management stations 22 may also be in communication with the entities 12 by way of the network 16. Information messages generated by the entities 12, or responsive to inquiry generated at the network management station, are provided to the management station 22 by way of the network 16. It is noted that each network station 22 may be associated with a particular client, and all of the associated clients' stations 22 interface with a user interface/data collection unit 58, which will be discussed in more detail later. The stations 22 may be implemented by an Application Programming Interface (API), or some other type of software, hardware, or combinations thereof.

The illustrated networks 16 may be representative of a private network placeable in connectivity with a public network 26, such as the internet, and may also include there between a firewall 28a, 28b. Messages generated external to the private networks 16 and delivered to the firewalls 28 by way of the public network 26 are also routable by way of the networks 16 to the network management stations 22.

The system 10 is representative of any various networks, such as a business network, a manufacturing network, a medical network system, etc. While the following description shall describe exemplary operation with respect to an exemplary implementation in which the network system comprises a computer network system in which the network entities comprise computer servers, work stations, and the like, the network system is more generally representative of any of various network systems with the network entities being any various entities. Additionally, the exemplary configuration shown in FIG. 1 is by way of example only. In other implementations, the system 10 may be configured in other manners, and include three or more networks 16 and/or network management stations 22.

The network management stations 22 each include an exemplary apparatus 36a, 36b. The apparatus 36a, 36b facilitate analysis of operation of the network systems by collecting information related to the occurrence of events at the network system in a manner that provides a manager or operator of the network system with indications of events that are considered to be significant, thereby to permit the manager or operator more quickly to take responsive action. Apparatus 16 is functionally represented, and may be implementable in any desired manner including, for instance, by hardware elements, firmware elements, algorithms executable by processing circuitry, and combinations thereof. Additionally, while the elements of the apparatus 36a, 36b are, in the illustrated implementation, formed at a single physical entity, in other implementations, the elements may be distributed among more than one physical entity.

Each apparatus 36 includes a data collector 38, a matcher 42, a normalizer 46, a scorer 48, a prioritizer 50, a database 52, and an input/output (I/O) 54. The I/O may be configured to generate and transmit information to be used and displayed at a common user interface 58. User interface 58 is configured for monitoring multiple stations 22 and associated networks 16.

The data collectors 38 operate as event collection engines utilizing, for example, a SYSLOG or SNMP, or other analogous collection algorithm. Data collected by data collectors 38 pertain to events occurring within, or related to, the network system (e.g., the associated network 16 and various network entities 12). The collected event occurrence information, comprising raw data, is stored in the databases 52a or 52b, and thus available for subsequent retrieval. In one implementation, the data collectors 38 may comprise a component capable of loading dynamic plug-ins that support a myriad of vendors in order consistently to pulse more unique data on remote vendor systems.

The collected data stored in databases 52, or immediately collected by collector 38, are accessible by matchers 42a, 42b. Matchers 42 operate to match the collected data with predetermined conditions or "event rules", thereby forming event occurrence items. The event rules are user-defined rules or are otherwise defined. Matchers 42 match selected ones of the event rules with the event occurrence items that have been collected by the data collector. If the event occurrence item corresponds with an event rule, then the event occurrence item is considered to be a potentially significant event occurrence. Matching operations may be performed on all or selected portions of the event occurrence items collected by the data collector. Event occurrence items that match the event rules may then be normalized by normalizers 46. Normalizers 46 operate to extract, or otherwise identify the significant portions of the matched, event item occurrences. The normalizers 46 are also capable of accessing the databases 52 to be provided with the event occurrence items matched by the matcher. In addition, normalized, event occurrence items are also cached, or stored, at the database 52.

The scorers 48 also are capable of accessing the database 52. The scorers 48 operate to score (i.e., provide a quantitative value) to the normalized, matched event occurrence items. Scoring is performed by comparing the normalized, event occurrence item with score event rules. If the event occurrence item corresponds with the score event rule, then a match is made, and a score associated event occurrence item is incremented. In the exemplary implementation, each normalized, event occurrence item is scored against multiple score event rules. If a normalized event occurrence item matches multiple score event rules, then the score of the event occurrence item is of a greater value than an event occurrence item that matches fewer, or no, score event rules. The score associates a score with the event occurrence item, and the score associated with the event occurrence item is stored at the database, indexed together with the associated event occurrence item.

Prioritizers 50 access the databases 52 to obtain, or to be directly provided with, the scores associated with the event occurrence items. Prioritizers 50 prioritize the event item occurrences based upon the score assigned to the individual ones of the event occurrence items by scorers 48. The prioritizers 50 prioritize the event occurrence items, e.g., in numerical order, from highest score to lowest score, to prioritize the event occurrence items from potentially most significant, based upon the score, to least significant, based upon the score. The prioritized item entries are used, for example, to form a list of event occurrence items. Priority indications are also associated with the event occurrence items, stored at the databases 52 or immediately provided to the I/O 54. If all of the event occurrence items are considered to be an initial set, then the event occurrence items that the matchers 42 indicate to match with the event rules form a subset of the initial set. The scorers 48 score only the event occurrence items of the subset. In addition, the prioritizers 50 prioritize the items of the subset.

The I/O 56 may be configured to generate information pertaining to a prioritized listing, as well as information relating to the prioritized event occurrence items. This information is provided to or queried by the user interface 58 to permit a network system manager or operator to view the event occurrence items considered to be of greatest significance prior to lesser-prioritized event occurrence items. Additionally, through matching operations performed by the matchers 42, and subsequent normalization by the normalizers 46, the large numbers of event occurrence items are reduced so that insignificant event occurrence items are removed from further consideration. The items remain available, however, in one implementation, at the database 52 if subsequent analysis necessitates review of this additional information. It is noted that the querying of the interface 58 may be effected as a hook that pulls data from the stations 22, without necessarily a query or request per se.

In an exemplary configuration of FIG. 1, the system 10 is configured as an MSSP type arrangement where a central security provider monitors multiple systems, such as stations 22a, 22b and associated networks 16a, 16b. In this case, the system 10 includes a user interface 58 configured to effect database sharding in order to achieve better efficiency, especially when monitoring numerous client stations 22. Database sharding is a known "shared-nothing" partitioning scheme that is advantageous when using large databases (e.g., 52) across a number of servers (e.g., stations 22), that affords better database performance and scalability. This is accomplished, in part, by breaking down the collective database down into smaller chunks called "shards" that are spread across a number of distributed servers.

Further, the system 10 may include the use of a distributed memory caching algorithm, Application Protocol Interface (API), or system such as open source software "Memcached" by Danga Interactive, for example. The memory caching, as illustrated by cache 60 in interface 58, may be used for storing data, such as the correlation data (e.g. scored events), in memory with a temporal aspect (i.e., a timeout for storing data, after which the data is purged or overwritten). In a particular aspect, the use of Memcached's API, as one example, provides a large hash table distributed across multiple machines (e.g., stations 22). When the hash table is full, subsequent inserts cause older data to be purged in a least recently used (LRU) order. By using such distributed memory caching, the system 10 may be sped up, which is particular advantageous in threat detection and security systems. It is noted that although the cache 60 is illustrated within interface 58, this is merely exemplary, and the cache 60 may be located in a separate device communicatively couple with stations 22 and interface 58.

Still further with respect to FIG. 1, it is noted that each client's station 22 may interface with the interface 58 via a network such as the internet or world wide web (e.g. 26), or alternatively may communicate directly as indicated by the dashed arrows from stations 22 to interface 58. In the case of a web interface or web portal interface, code or an API indicated by block 61 may effect web interface with client stations 22 or with another client device (not shown). Additionally, features of the web interface may include the functionality of allow clients to create user privileges allowing change to configurations such as ruleset (to be discussed further in later portions of this application), as well as user rights assignments for allowing access. Furthermore, the interface 58, 61 affords the ability for a client with multi-tenants to create their own rulesets, as well as accommodate different systems such as Unix or Windows systems. It is also noted that interface 58 may be virtually effected or hosted in a cloud computing environment across multiple and varied servers.

Figure 2:
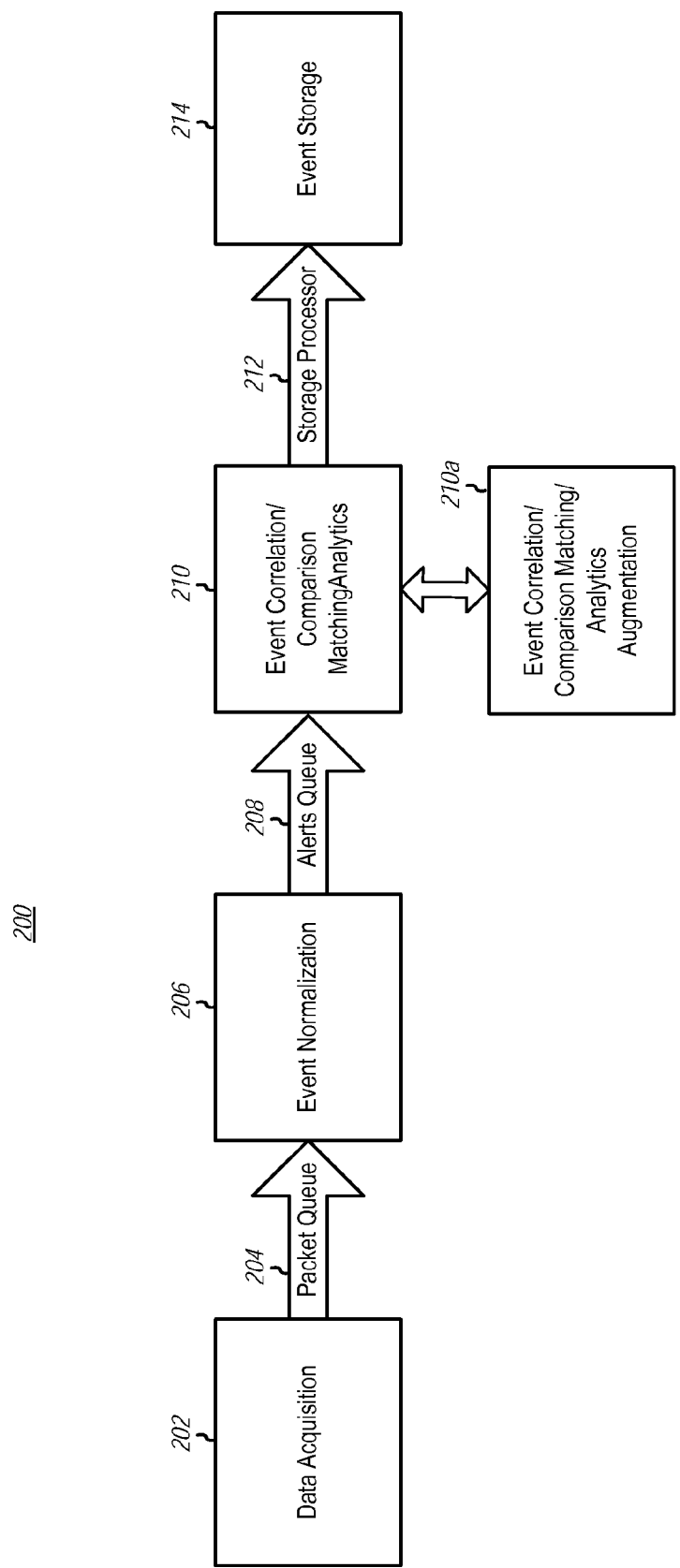
FIG. 2 illustrates a process diagram representative of the process of acquiring, normalizing, correlating or matching, and storing of event data during operation of the presently disclosed apparatus and methods.

Turning next to FIG. 2, a process or implementation 200 is shown, which is representative of the operation of or a model of at least a portion of one or more of the apparatus 36 shown in FIG. 1. As indicated by block 202, event data is acquired or generated, either by network-system-entity origination, external origination, or responsive to network-system request. The data are related to the occurrence of events that pertain to the network system, i.e., comprise event occurrences. In an aspect, the event occurrences may be collected as event occurrence items by the data collectors 38a or 38b shown in FIG. 1.

As indicated by arrow 204, the acquired data is then queued for input to event normalization 206. After normalization, an alerts queue 208 is generated for processing by an event correlation, comparison matching, or other analytics process or engine 210. Here the event data may be correlated and comparison matched through use of a rule set that utilizes a decision tree algorithm and/or fuzzy logic effected by matchers 42, and scorers 48, as an example. Block 210 may also implement various other functionalities, such as analytics for data measurement as one example, as will be explained later in this description.

Accompanying the event correlation/comparison matching/analytics engine 210 may be an event correlation/comparison matching/analytics augmentation engine 210a for effecting various functionalities and other analytics to augment the correlation or comparison matching and analytics performed by event correlation engine 210. The engines 210 and 210a may function concurrently, and may be in communication with one another, as well as operate simultaneously, with either interdependent operation, or independent operation.

For purposes of the present disclosure, it is noted here that block 210 may perform any number of different analyses, wherein the term "analysis" used herein may mean any number of various operations and functions. One example of performed analysis by block 210 includes event correlation, which may connote data merging and similar functions. Another example under the penumbra of "correlation" includes comparison matching to determine if event data or information matches predetermined rules indicative of various events and threats. Block 210 may also be configured to perform other analyses consisting of what is termed as "analytics." This term may connote data measurement or other manipulation of data, as well determining network and user behaviors, building network/host and user profiles from logged information and data, determining user or network anomalies based on the user profiles, and other analytics performed on large or big data sets to identify threats and various indicators of compromise (IOC's), for example.

Event occurrence items that match the rules with which the items are then output for further processing as indicated by arrow 212 and storage as indicated by event storage 214 (e.g., databases 52).

It is further noted that the user profiles, as mentioned above, may be represented by sketch profiles of usernames, summarizations of event log activity, as well as access controls and other particular attributes that may be valuable when determining and measuring normal verses abnormal behavior. According to an aspect, additional details that may be gathered in relation to a building user profiles, which are not powered by event log activity data, may include Lightweight Directory Access Protocol (LDAP)/Active Directory, Remote Authentication Dial In User Service (RADIUS), Terminal Access Controller Access-Control System Plus (Tacacs+), multi-factor authentication and authorization gateways, vulnerability management vendors, as well as any other potential security vendor that could provide additional information that could be used.

In operation within the presently disclosed apparatus and methods, the user profiles can be used to detect user behavior anomalies by comparing the existing behavior that is occurring for a specific username in real time by dual comparing the following:
 (1) using statistical algorithm and other analytics to measure deviation/relationship between sketched event activity and normal behaving profile in conjunction with the dynamic data gathered outside of event information; and
 (2) Rule based comparisons (Boolean Expression Tree Collections) for user defined detection based in conjunction with the dynamic data gathered outside of event information, as well as the context of event information:

Network/host profiles may be represented by sketch profiles of host behavior, summarizations of event log activity, bandwidth utilization, and other network behaviors, as well as for each destination or source host. These profiles may be used to analyze and determine which hosts are known to communicate and other particular attributes that may be valuable when determining and measuring normal verses abnormal behavior including port activity, application activity, as well as security threat information. Some additional details that can be gathered in relation to the network profiles, but that is not powered by event/log data, includes Netflow data streams, operations management solutions, as well as any other potential security vendor that could provide additional information that could be used (e.g., RedSeal).

Host/network behavior anomalies are detected by comparing the existing behavior that is occurring for a specific host in real time by dual comparing the following:
 (1) using statistical algorithm and other analytics to measure deviation/relationship measurements between sketched event activity and normal behaving profile in conjunction with the dynamic data gathered outside of event information; and
 (2) Rule based comparisons (Boolean Expression Tree Collections) for user defined detection based in conjunction with the dynamic data gathered outside of event information, as well as the context of event information.

Figure 3:
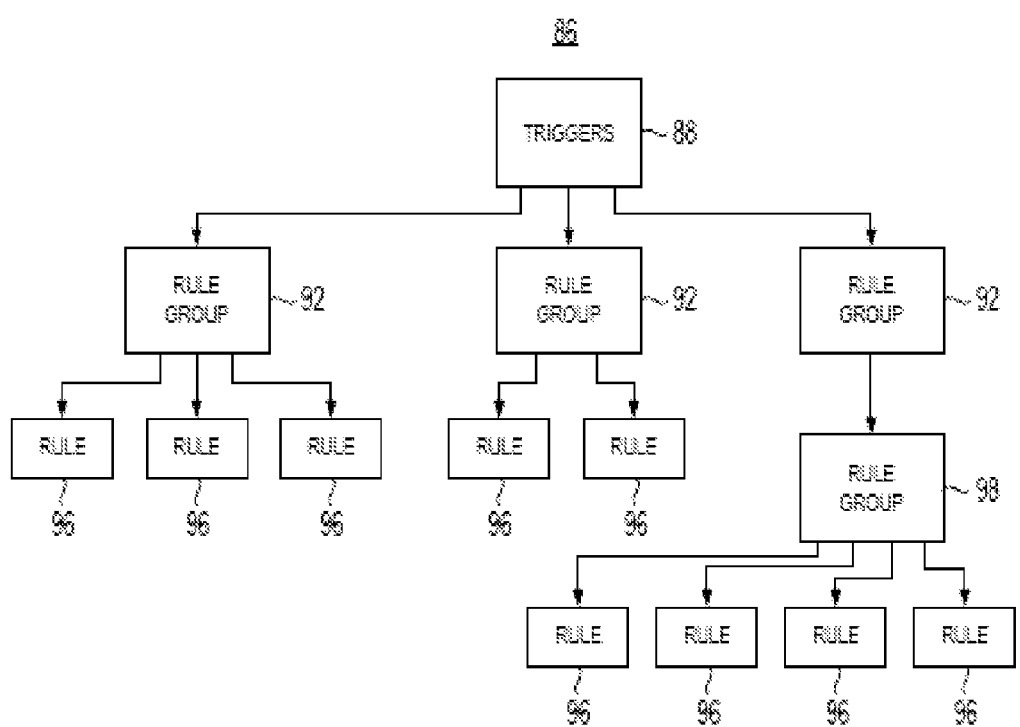
FIG. 3 illustrates an exemplary representation of a nested, management tree used pursuant to matching operations.

FIG. 3 illustrates an exemplary decision tree 86, utilized to match event occurrence items with event rules. The decision tree defines multiple layers and is configured to provide for quick matching of an event item to its related signature. A first layer is referred to as a trigger. The exemplary decision tree 86 includes a single trigger 88. Other decision trees have additional triggers. Determination is made as to whether the trigger matches the event occurrence item. If the event occurrence item matches the trigger, then rule groups, here rule groups 92 are accessed and the event rules 96 are compared with the event occurrence items to determine whether the event occurrence items match with the respective event rules. Nesting within the decision tree is possible, indicated by the sub-rule group 98 of one of the rule groups 92.

Additionally, a module is a container of similar triggers, rule groups, and rules. A module can also contain information regarding the module, including its name, description, devices that the module supports, versioning information, and any other appropriate further documentation related to the module. The nesting of the rule groups facilitates grouping similar rules together. In order for rules to be processed within a rule group, the rule group must match the event occurrence item that is compared against the rule group. In addition, when a rule group is nested, a match of both the rule group and the sub-rule group is required.

In operation, when an indication of an event occurrence is received, the received indication is processed by a receiving engine, represented in FIG. 1 by the data collector 38. Examples of receiving engines include the aforementioned SMNP, SYSLOG, and other algorithms. A role of the receiving engine is to convert the received information into a normalized event. The normalized event is represented, e.g., by a hash table, comprising related information of the indication of the event occurrence, including, e.g., network address information, a received time stamp, and the payload of the message of the received indication. The normalized event is provided to an event matching module, represented by matchers 42 in FIG. 1.

The event matching module is responsible for taking the initial, normalized event and matching the indication of the event against the pre-defined rule set. The is carried out through recursive functionality, providing a tree-like structure, such as the decision tree 86, for data management. The rule set modules include, e.g., compiled modules and a textural rule set. Binary, compiled modules are not defined by behavior and are able to accomplish matching by any available manner or by taking advantage of textual rule sets.

Textual rule sets are separated into three basic classifications that provide for matching. The first class-type is defined as a trigger. A trigger, such as the trigger 88, is a regular expression that must match in order for the rules within the module to continue processing. Additionally, a list of triggers can be specified. Upon matching of a first successful trigger, processing of the associated module continues. A subsequent separating stage comprises the multi-decision tree structure in which any desired number of peer or child nodes for any specified node within the tree structure can be created. Each requires a successful matching before matching against a child node thereof within the decision tree. Rule grouping allows like rules to be grouped together in as many levels as desired, thereby to improve the speed of matching against a lengthy rule list.

A rule contains all of the information required for improved matching, correlation, and scoring. Each rule contains the alert name, a category, a knowledge base identification, host and network packet information, as well as audit procedure information for compliance, monitoring, and scoring. A final rule, upon a successful match, permits assignation of the specific information to a normalized has table to the event occurrence item. In addition, a final rule allows for multiple matching rules as well as a logical no indication. Once all activities are complete, the event is passed into a processing queue for archiving, scoring, and performing additional correlation.

Figure 4:
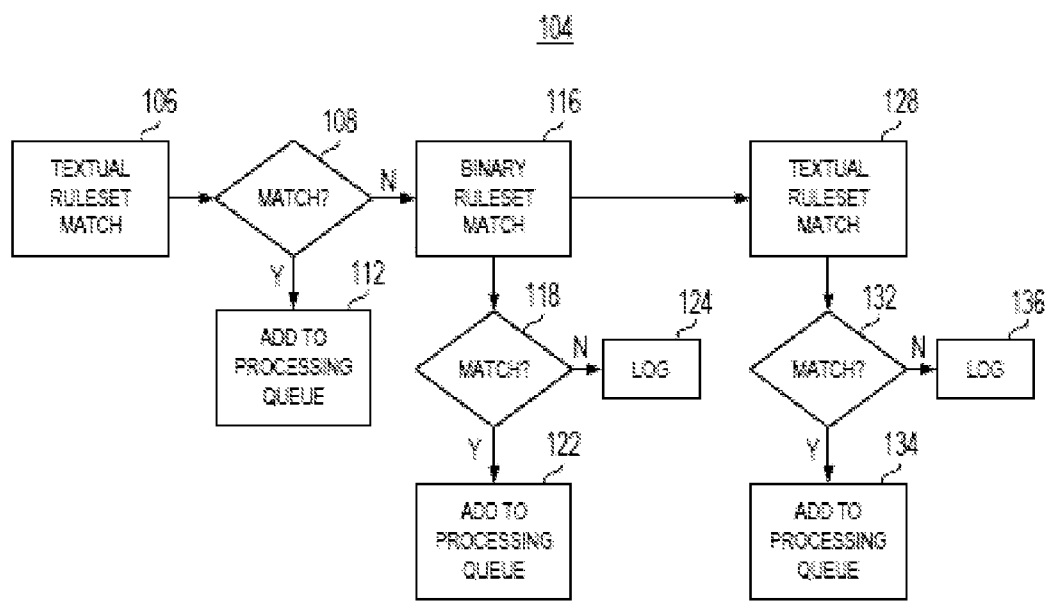
FIG. 4 illustrates another process diagram, also representative of the process of matching performed during operation of an embodiment of the present invention.

FIG. 4 illustrates a process diagram 104. The process 104 is representative of logical decisions made through use of the decision-tree architecture shown in FIG. 3. First and as indicated by the block 106, a textual rule set match is created. Then, a determination is made at the decision block 108 as to whether a match has been made. If yes, the associated event occurrence item is added to a processing queue, indicated by the block 112. If, conversely, a match is not made, the no branch is taken to the block 116, and a binary rule set matching operation is carried out. A determination is made, indicated at the decision block 118, as to whether the event occurrence item matches the rule of the rule set. If so, the event occurrence item is added to the processing queue, indicated at the block 122. If, conversely, a match is not made, the no branch is taken from the decision block 118 to the log block 124.

The process 104 further includes the additional optional operations, indicated at the block 128 of performing a textual rule set match. A determination is made, indicated by the decision block 132, as to whether a match is made. If so, the yes branch is taken to the block 134, and the event occurrence is added to the processing queue. Otherwise the no branch is taken to the log block 136, and the lack of match is logged.

Figure 5:
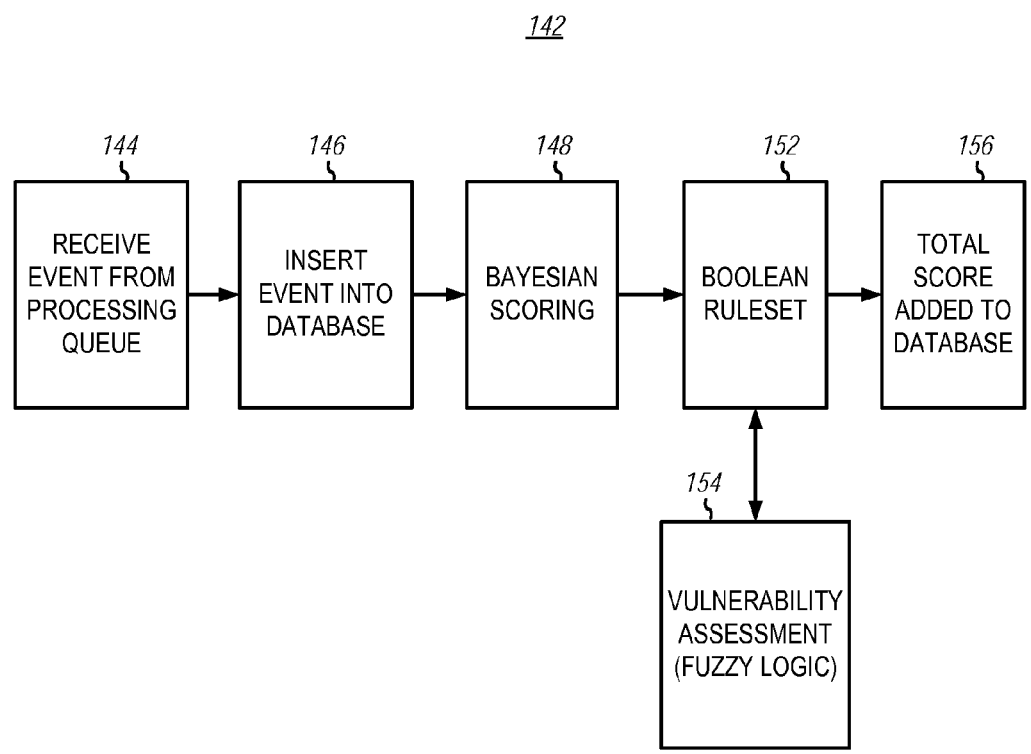
FIG. 5 illustrates a diagram representative of the process of storing performed during operation of an embodiment of the present invention.

FIG. 5 illustrates a process 142 representative of further exemplary operation of an embodiment of the present invention. The process 142 is representative of scoring of event occurrence items that have been matched by a matching operation with an event rule of an event rule set.

First, and as indicated by the block 144, the event is received from a processing queue. Then, and as indicated by the block 146, the event occurrence item is inserted into a database. In addition, as indicated by the block 148, Bayesian scoring is performed. Then, and as indicated by the block 152, Boolean rules of a score rule set are compared with the event occurrence item.

Additionally, the present process 142 further includes a vulnerability assessment in conjunction with the Boolean comparison in block 152 as indicated in block 154. The vulnerability management may utilize fuzzy logic or an equivalent thereof to compare how closely two strings match. For example, if two compared strings are 70 percent in the closeness, the management block 154 may return a score of "X". If the compared strings even more closely match, such as 90 percent match, the vulnerability management block 154 may assign another higher score of "Y", whereas if the match is not close (e.g., 10%), then the block might return a zero score as part of the vulnerability management. This vulnerability management affords current assessment of vulnerabilities rather than rely upon potentially much delayed assessment based on Common Vulnerability Exposure (CVE) data.

Finally, as indicated by the block 156, a summed score, i.e., a cumulated or cumulative score, of matches of score rules of a score rule set and the event occurrence item is obtained.

An event occurrence item is received, matched, normalized, and correlated based upon relative information. Then, a score is assigned to the event occurrence item. The score value is determined from a variable length, rule set that determines a successful or unsuccessful match against the unique rules of the rule set. Each rule of the score rule set can have multiple arguments and, in the exemplary implementation, implemented as a Boolean rule, as a positive or negative value. The score, responsive to a successful match of a specific score rule, is summed together with other score-rule results in order to arrive at a final, overall score. The overall score is responsible for relating importance, acting upon thresholds, etc.

An event is any event that might be of interest, such as a user action, a log entry, a security notification, or a performance statistic. A message identifying an event occurrence is originated at any of various devices, including, e.g., an information security device, a network appliance, a computer server, and a computer work station. In addition, once an event occurrence item is read from a processing and scoring queue, the information related thereto is written to a database, scored against a multitude of scoring mechanisms, and the total score is updated against the newly processed event.

In the exemplary implementation, before an event is compared against rules of a score rule set, a Naïve Bayesian score is determined. The score is determined by first taking the necessary data chunks out of each required string. The strings are extracted from any of various places including, e.g., the alert name, category type, and payload part of the event occurrence item message.

The Bayesian score is included with existing event properties that are processed by the score rule sets. A rule set is any list of rules that is associated with a positive, or negative, score. When a rule set matches against a provided event, the associated score is added to the existing score. The initial score is zero. Once all of the rules have been compared against an event, a total score is determined and associated within a database to the initial event information, permitting future actions to be taken, based upon a score threshold.

The following are exemplary actions that define score rules that are matched against an event occurrence item. An alert name (regular expressions), an alert category (regular expressions), audit actions, Bayesian score, count (by host/alert), a count (by host/category), a host, either destination or source, an event payload, a port, either destination or source, an alert priority, a resource, and a time stamp are exemplary rules of a score rule set that are utilized in various implementations, define matches that are scored.

When a Bayesian score is utilized, a Bayesian histogram analysis algorithm is utilized to uniquely fingerprint known security and performance issues, while establishing a base line for positive or neutrally-acceptable network traffic, utilizing standard deviation. The algorithm identifies unique attributes within a specified target event. The activity in conjunction with standard deviation facilitates pattern matching. Thereby, both known or trained information is matched and, through use of standard deviation, target events that have not been trained or identified are also matched. An operating baseline is thereby established.

Figure 6:
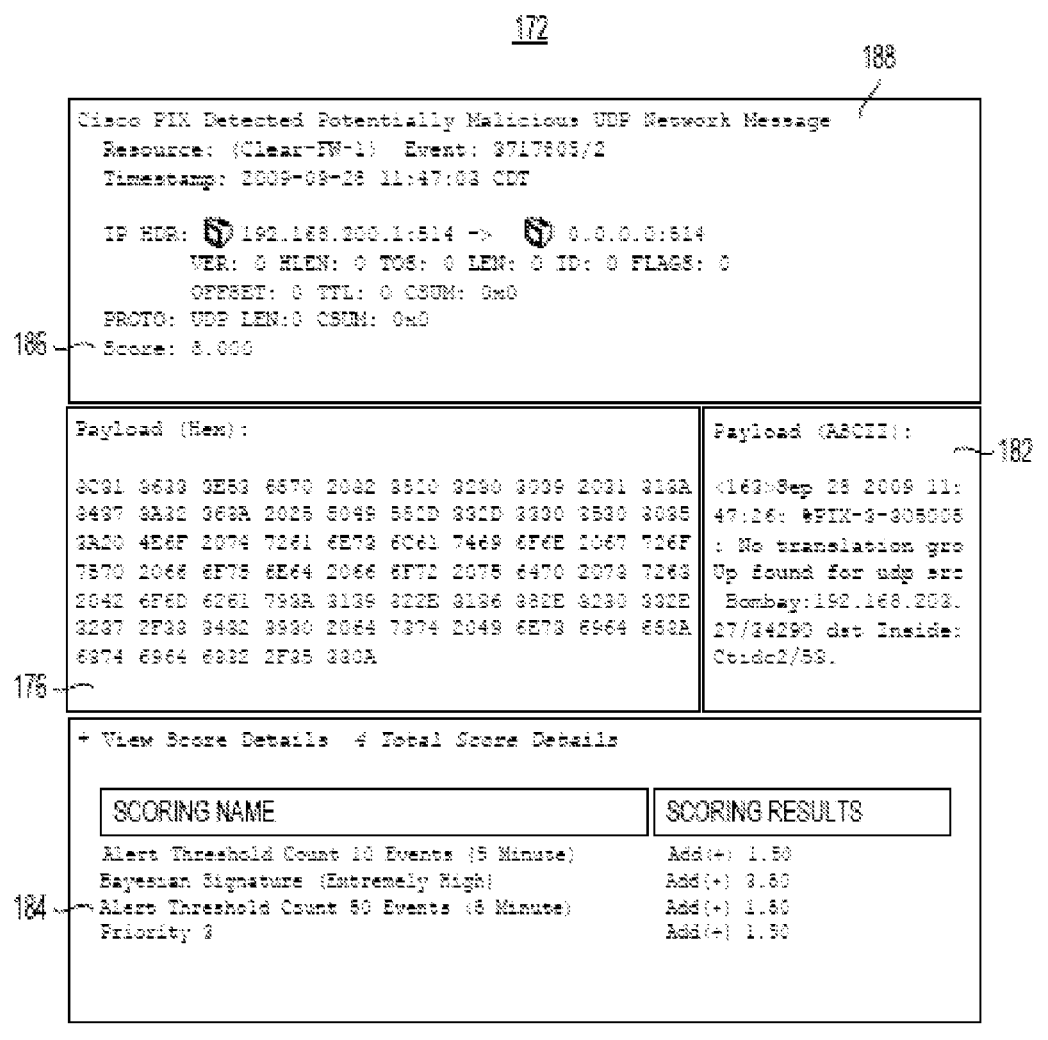

FIG. 6 illustrates an exemplary screen display 172 generated during operation of an embodiment of the present invention. The screen display is related to a single event occurrence item. Here, the raw data comprising the message forming the event occurrence item is displayed in hexadecimal form at the portion 176 and in ASCII form at the portion 182. Scoring results are indicated at the portion 184, a total score is indicated at 186, and other descriptive information is displayed in the portion 188. The display 172 is displayed at a display screen of the user interface, which provides a role-based access control for administration over secure encrypted sessions.

Figure 7:
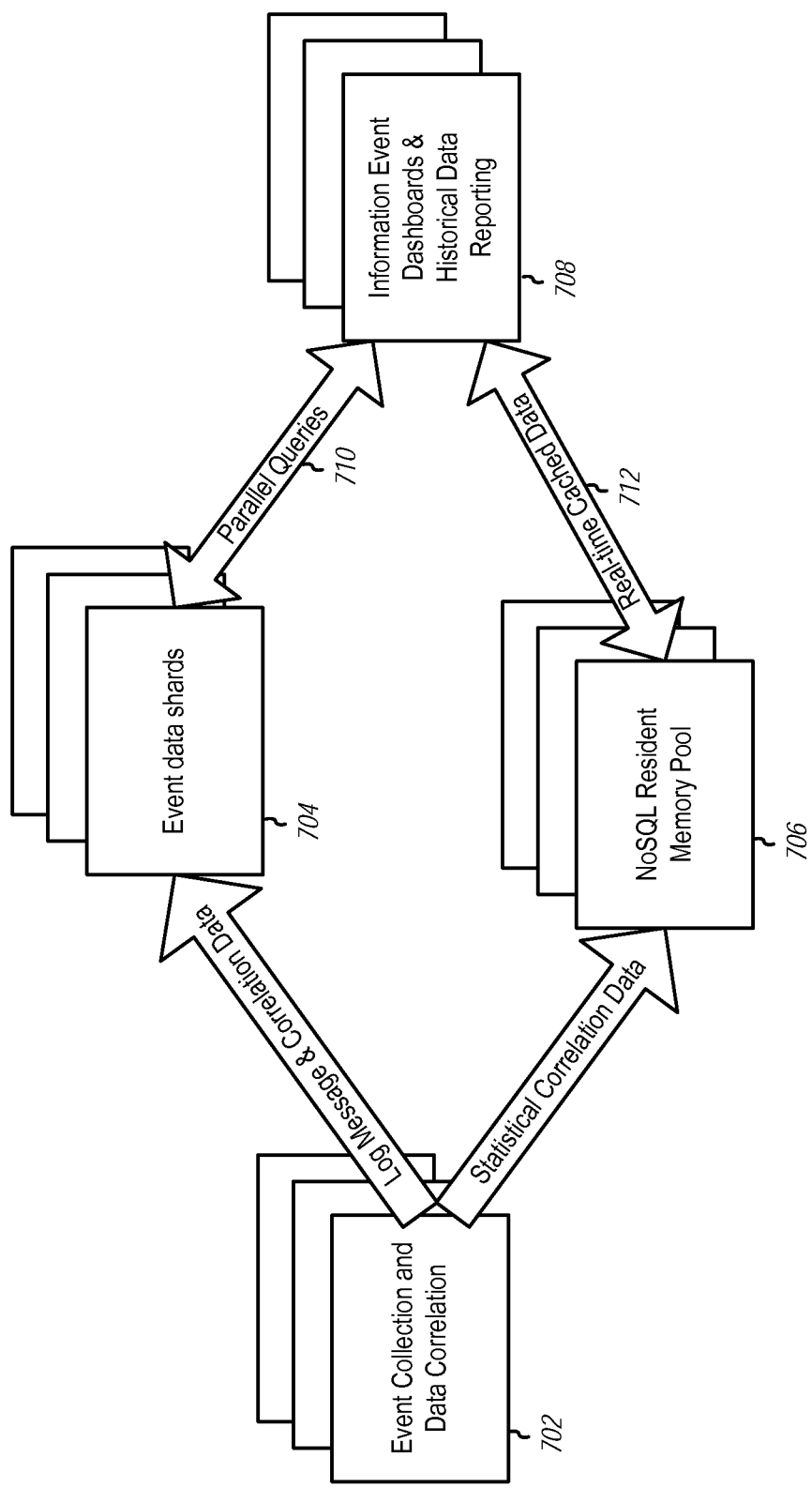
FIG. 7 illustrates an exemplary process flow in the system of FIG. 1 in relation to use of database sharding and distributed memory caching.

FIG. 7 illustrates an exemplary process flow in the system 10 in relation to use of database sharding and distributed memory caching. As illustrated, event collection and data correlation is performed at blocks 702 by multiple devices, such as stations 22. In a particular example, the event collection may be performed by data collectors 38, and correlation performed by matchers 42, normalizers 46, and scorers 48. Log Messages and correlation data are sharded across databases 52, at database storage within interface 58 (not shown), or both as event data shards as illustrated by block 704. Statistical correlation data, such as data generated by scorers 48 is cached in a distributed memory cache or NoSQL Resident Memory Pool, such as cache 60, as shown by blocks 706.

Block 708 illustrates that information event dashboards, or other display methods, and historical data reporting may be effected by parallel queries 710 to the event data shards stored across multiple databases (e.g., 52) in system 10. Furthermore, real-time cached data from the NoSQL Resident memory pool (e.g., cache 60), may be accessed as shown by arrow 712. This affords current event occurrence information of threats or other types of activity in real-time without the need for large SQL database storage.

Figure 8:
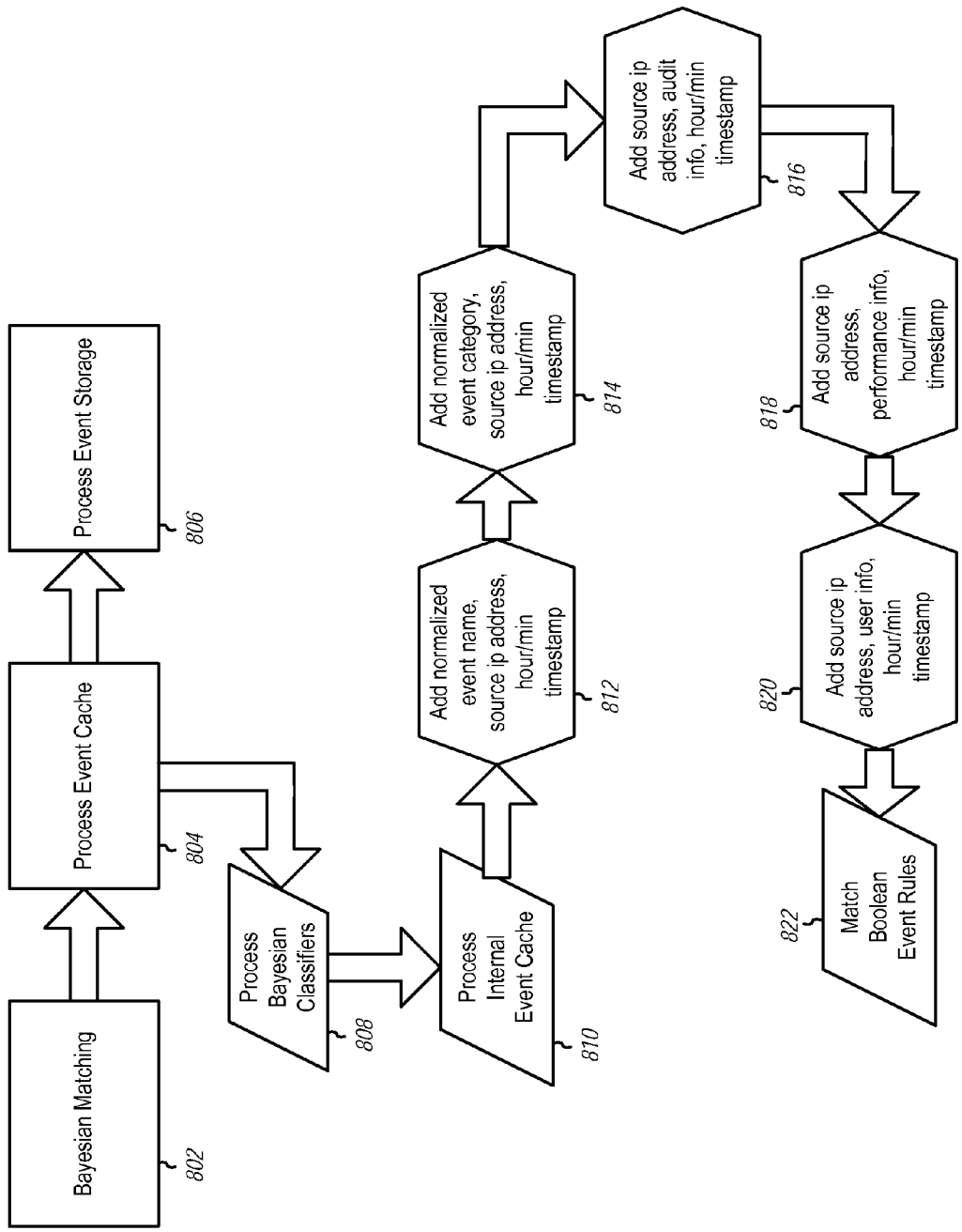
FIG. 8 illustrates an exemplary process flow for event correlation according to the present disclosure.

FIG. 8 illustrates an exemplary flow diagram 800 of an exemplary process for event correlation after the Bayesian matching in block 210 of FIG. 2. In particular, process 800 is a means of populating data in the Memcached cache. As shown, after Bayesian matching 802 flow proceeds to a process event caching or storage process in block 804. Event storage may be processes as indicated in block 806. Additionally, Bayesian classifiers may be processed as indicated by operation 808. Here attributes are learned, whether good or bad.

After block 808, an internal event cache processing is effected as shown in block 910. Processes as part of this processing are illustrated by block 812, 814, 816, 818, and 820 where different key-value data are entered with the key indicating the type of data and value being the actual data. The types of data inserted in blocks 812 through 820 is not meant to be exhaustive, and is merely exemplary. Examples of various contemplated keys and their corresponding descriptions that may be cached are indicated in Table 1 below.

TABLE 1

| Correlation Key | Correlation Key Description |
| --- | --- |
| alert | Alert Name |
| alert_category | Alert Category |
| resource | Resource/Asset Name |
| payload/message | Payload |
| ip_src | Source IPv4/IPv6 |
| ip_dst | Destination IPv4/IPv6 |
| tcp_sport | TCP Source Port |
| tcp_dport | TCP Destination Port |
| udp_sport | UDP Source Port |
| udp_dport | UDP Destination Port |

TABLE 1-continued

| Correlation Key | Correlation Key Description |
| --- | --- |
| bayes_weight | Bayesian Weight |
| stddev_weight | Standard Deviation Weight |
| priority | Priority |
| timestamp | Event Timestamp |
| vuln | Vulnerability Threshold |
| correlation_username | Username |
| audit_login | Audit Action Login |
| audit_logoff | Audit Action Logoff |
| audit_policy_change | Audit Action Policy Change |
| audit_log_change | Audit Action Log Change |
| audit_object_access | Audit Action Object Access |
| audit_user_action | Audit Action User Action |
| audit_system_event | Audit Action System Event |
| audit_session_status | Audit Action Session Status |
| audit_account_validation | Audit Action Account Validation |
| audit_user_change | Audit Action User Change |
| audit_group_change | Audit Action Group Change |
| system.cpu.load | Performance CPU Load |
| system.cpu.util | Performance CPU Utilization |
| system.memory.size[free] | Performance Physical Memory Free |
| system.memory.size[total] | Performance Physical Memory Total |
| vm.memory.size[total] | Performance Virtual Memory Total |
| vm.memory.size[cached] | Performance Virtual Memory Cached |
| vm.memory.size[buffers] | Performance Virtual Memory Buffers |
| vm.memory.size[shared] | Performance Virtual Memory Shared |
| vm.memory.size[free] | Performance Virtual Memory Free |
| net.if.in[DEVICE_NAME,packets] | Network Interface Input Packets |
| net.if.in[DEVICE_NAME,bytes] | Network Interface Input Bytes |
| net.if.in[DEVICE_NAME,dropped] | Network Interface Input Dropped |
| netif.in[DEVICE_NAME,errors] | Network Interface Input Errors |
| net.if.out[DEVICE_NAME,packets] | Network Interface Output Packets |
| net.if.out[DEVICE_NAME,bytes] | Network Interface Output Bytes |
| net.if.out[DEVICE_NAME,dropped] | Network Interface Output Dropped |
| net.if.out[DEVICE_NAME,errors] | Network Interface Output Errors |
| vfs.dev.read[DISK_NAME,sectors] | Virtual Drive Read Sectors |
| vfs.dev.read[DISK_NAME,operations] | Virtual Drive Read Operations |
| vfs.dev.write[DISK_NAME,sectors] | Virtual Drive Write Sectors |
| vfs.dev.write[DISK_NAME,operations] | Virtual Drive Write Operations |
| vfs.fs.size[DISK_NAME,total] | Virtual Drive Size Total |
| vfs.fs.size[DISK_NAME,free] | Virtual Drive Size Free |

After population of data in the cache, matching of Boolean Event Rules is effected based on the stored data as indicated in block 822.

Figure 9:
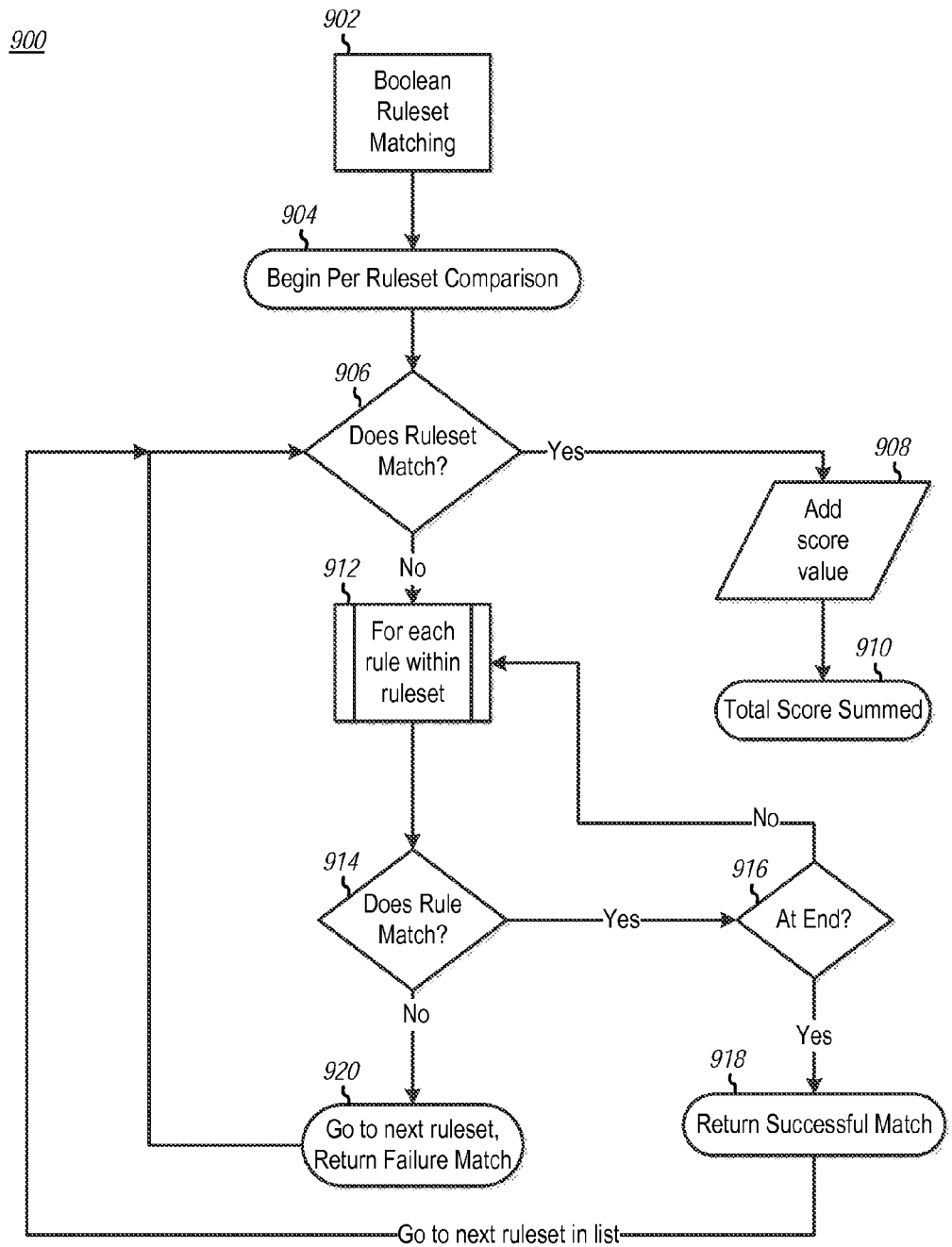
FIG. 9 illustrates a process for scoring ruleset matching for use in the presently disclosed apparatus and methods.

FIG. 9 illustrates a process 900 for scoring ruleset matching for use in the presently disclosed apparatus and methods. As illustrated, process 900 begins with initiation of Boolean ruleset matching as indicated by block 902. The process 900, in particular, begins a per ruleset comparison as indicated by block 904. A comparison is then performed in decision block 906 to determine an event matches with a ruleset. If so, flow proceeds to block 908 where a score value is added and then the total score summed as indicated in block 910.

Alternatively at block 906, if the ruleset does not match, flow proceeds to block 912 where a comparison of whether each rule within a ruleset matches as indicated in block 914. If an event rule matches, flow proceeds to block 916 to determine if the end of the rules within the ruleset has occurred (i.e., all rules in the ruleset have been examined). If not, flow proceeds back to block 912. On the other hand, if the end of the rules has occurred as determined in block 916, flow proceeds to block 918 to indicate a successful match has been returned, and flow proceeds back to block 906 to compare to a next ruleset. If the rule does not match, as determined in decision block 914, flow proceeds to block 920, wherein a failure match is returned and flow then proceeds to the next ruleset.

As part of the event correlation process (or engine) 210 shown in FIG. 2, further processes may effected according to the present disclosure when performing matching comparisons. According to an aspect, a particular process or method involves the implementation of an interval comparison within Boolean expression trees and expression diagrams. This methodology is used to determine if the scoring of a normalized event as determined in process 206, for example, scoring matches or not. As explained earlier, scorers 48, for example, operate to score (i.e., provide a quantitative value) the normalized, matched event occurrence items. Scoring is performed by comparing the normalized event occurrence item with score event rules. If the event occurrence item corresponds with the score event rule, then a match is made, and a score associated event occurrence item is increased or decreased. In the exemplary implementation, each normalized event occurrence item is scored against multiple score event rules. If a normalized event occurrence item matches multiple score event rules, then the score of the event occurrence item is of a greater value than an event occurrence item that matches fewer, or no, score event rules. The score associates a score with the event occurrence item, and the score associated with the event occurrence item is stored at the database, indexed together with the associated event occurrence item. A benefit of using interval matching is faster performance improvements when making complex comparisons and the avoidance of double matching, thereby increasing the overall speed and efficacy of the event correlation process.

According to an aspect of the present disclosure, the interval matching process first includes a labeling process whereby nodes of a Boolean expression tree are labeled, categorized, or assigned. After the nodes are properly labeled then a matching process is implemented to create a matched array of a number of intervals.

Figure 10:
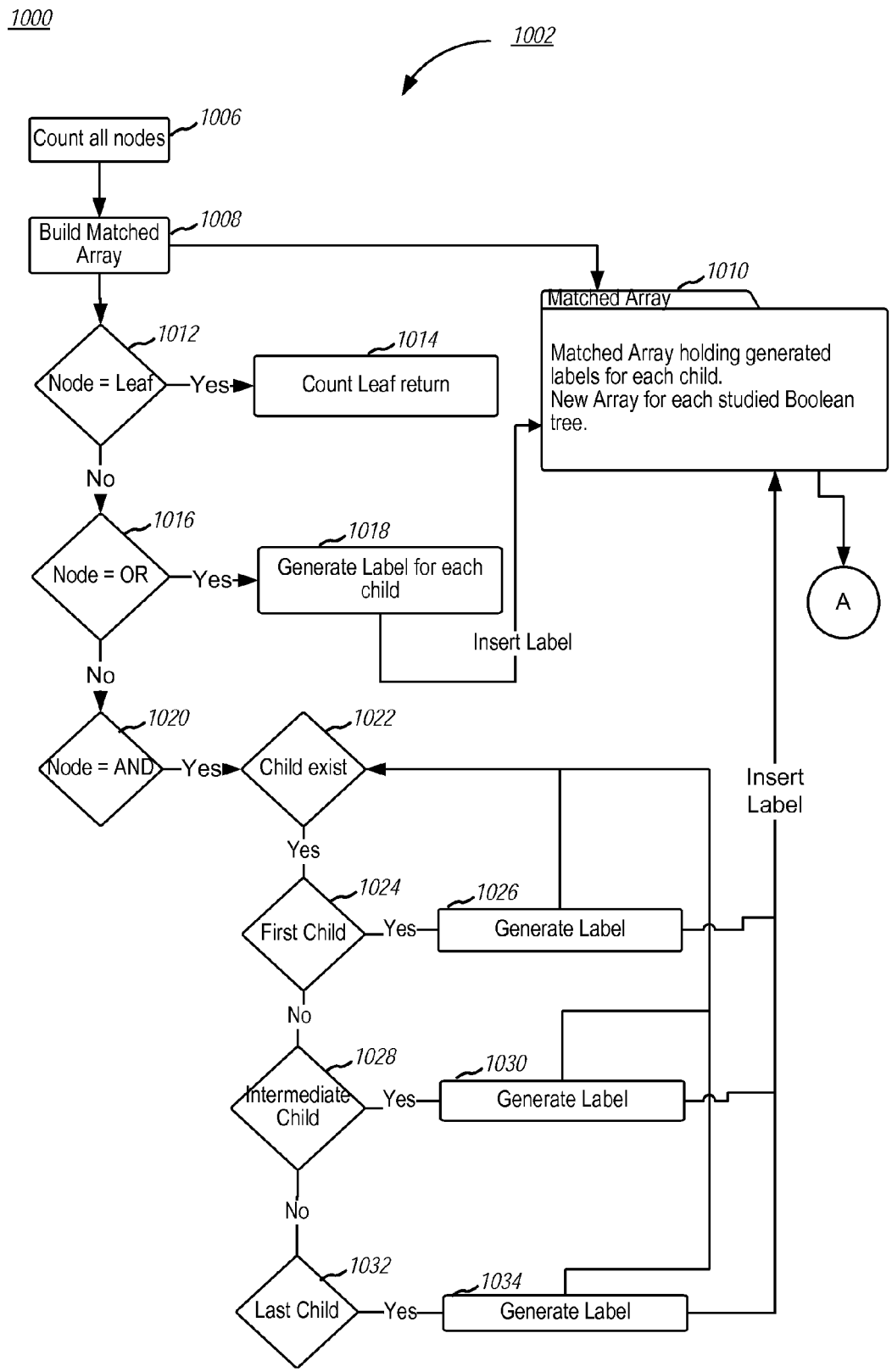
FIGS. 10 and 11 illustrate a method for implementation of interval comparison within Boolean expression trees and expression diagrams
Figure 11:
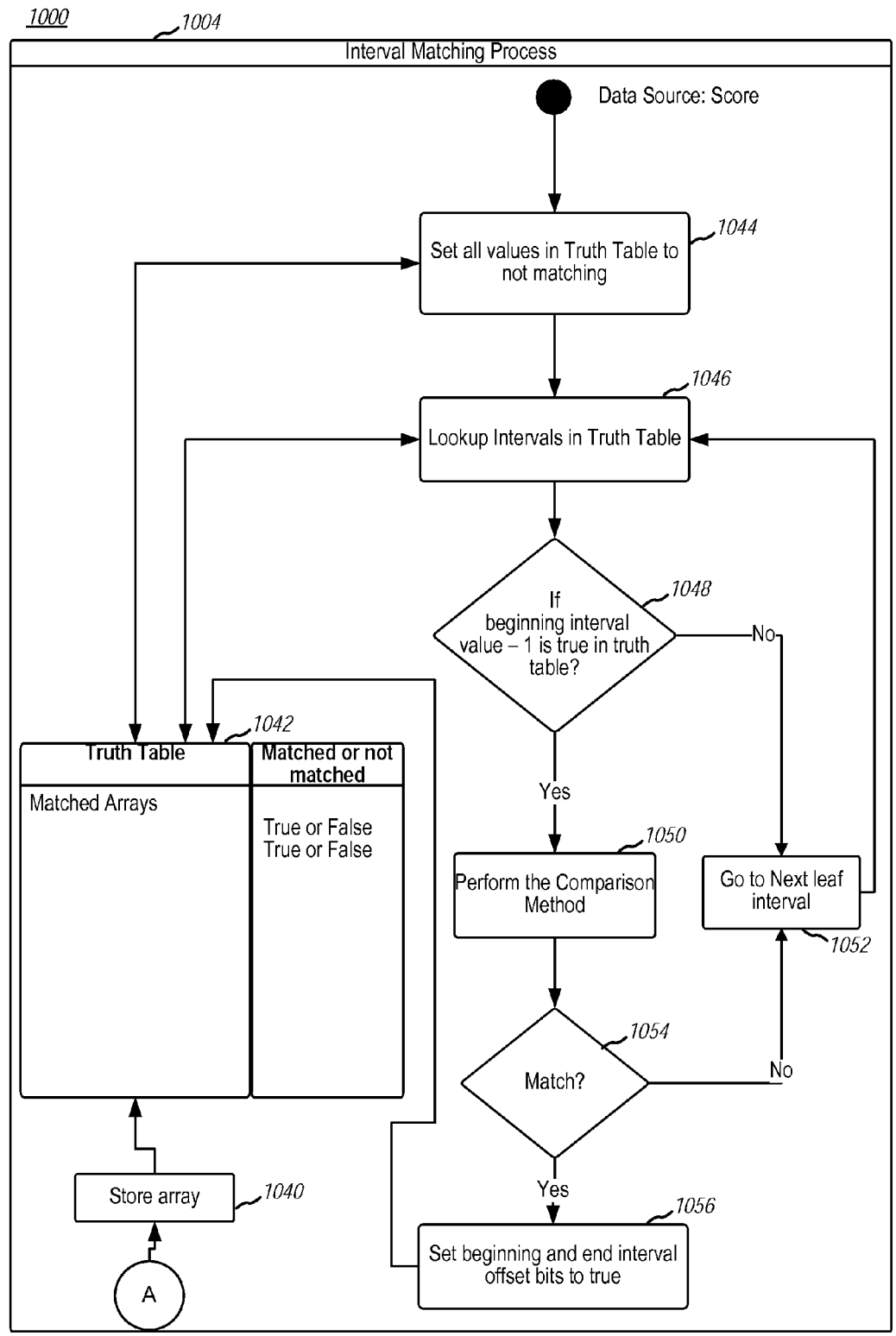

FIGS. 10 and 11 collectively illustrate a method 1000 for implementation of interval comparison within Boolean expression trees and expression diagrams. Method 1000 includes a node labeling process 1002 for building a matching array as illustrated specifically in FIG. 10, and an interval matching process 1004 using the array, and specifically illustrated in FIG. 11. Process 1000 may be implemented in the correlation engine 210 shown in FIG. 2.

Method 1000 begins with an accounting of all nodes as shown by block 1006. As illustrated, an arrow is shown from block 1008 to a matched array 1010 that is configured for holing or storing generated labels for each child node studied in the Boolean tree. It is also noted that a new array is built for each studied Boolean tree.

The remaining steps or processes shown in FIG. 10 for building the array 1010 are performed for each node. Flow proceeds to a first decision block 1012 to determine if the nth node in the studied tree is a leaf. If so, block 1014 indicates that the leaf is counted and the process returns to the start of the array building (e.g., step 1008).

If the nth node is not a leaf flow proceeds to decision block 106 to determine if the node is an "OR" node. If it is, flow proceeds to block 1018 where a label is generated for each of the children of the nth node under consideration and then inserted into the matched array 1010. IF the node is not an "OR" node as determined at block 106, flow proceeds to block 1020 where a determination is made whether the node is an "AND" node. If so, flow proceeds to block 1022 to determine if the nth node (being an AND node), has any children. If so, flow proceeds to block 1024 to determine if the child is a first child. If so, a label is generated (see block 1026) and inserted to array 1010, and the flow returns back to block 1022.

If the node is not a first child, then flow proceeds to block 1028 to determine if the node is an intermediate child. If so, a label is generated (see block 1030) and inserted to array 1010, and the flow returns back to block 1022. Alternatively at block 1028, if the node is not an intermediate child, a determination is made at block 1032 whether the node is a last child or children of the AND node. If yes, then a label is generated at block 1030 and inserted into array 1010, and flow proceeds back to block 1022.

After the process 1002 is completed (i.e., a particular matching array has been built for a studied Boolean tree), the interval matching process 1004 shown in FIG. 11 can be implemented or run. Prior to this, the array 1010 is stored in a truth table 1042, as indicated by reference letter "A" and also storing step 1040 in FIG. 11.

Turning to FIG. 11, the interval matching process 1004 includes the input of a data source; namely a score for an event, but not limited to such. Flow proceeds to block 1044 where an initialization of the truth table 1042 is accomplished by setting all values except the first one, to a state "not matching". Flow then proceeds to block 1046 where lookup intervals in the truth table are performed. If the beginning interval value minus one does not equal true, as determined at decision block 1048, then the current interval can be skipped and does not need to be compared as indicated by flow to block 1052 and flow therefrom back to block 1046. Alternatively, if the determination of block 1048 indicates a true condition, then flow proceeds to block 1050, where comparison matching is executed. If the comparison matches, as determined at block 1054, both the begin and end interval values are set in the truth table 1042 as shown at block 1056. The truth table 1042 can be evaluated by determining if ultimately the last truth table value is set to true.

As will be appreciated from the above discussion, the interval matching process is used to determine if a score matches or not. Advantageously, a Boolean expression tree can be managed (CRUD) in the GUI, which allows for easy management of complex comparisons and an improvement over previously known matching processes (e.g., 'SCAN' comparisons)

Figure 12A:
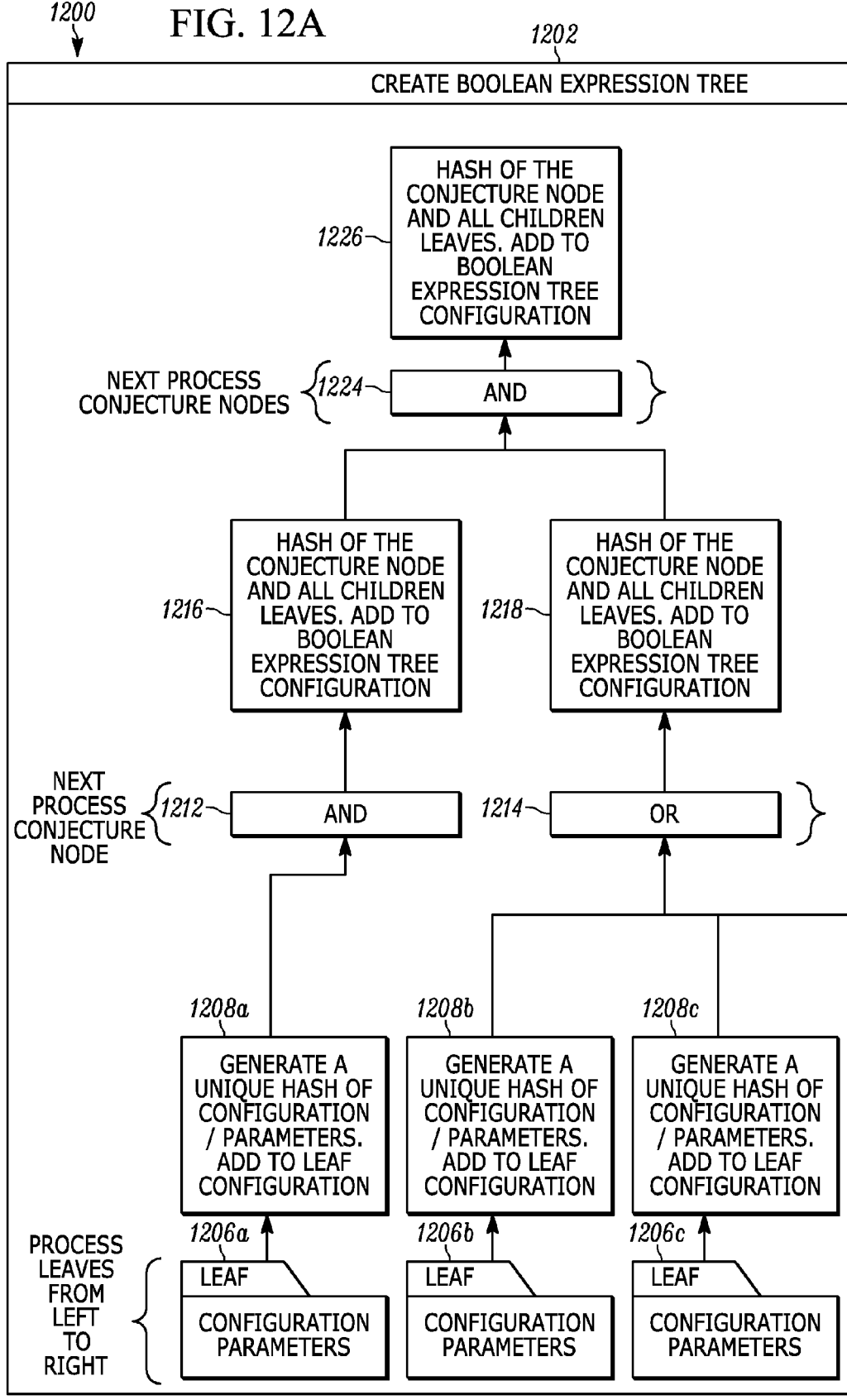
FIGS. 12A and 12B illustrate a method for caching execution results when comparing a collection of Boolean Expression tree and expression diagrams.
Figure 12B:
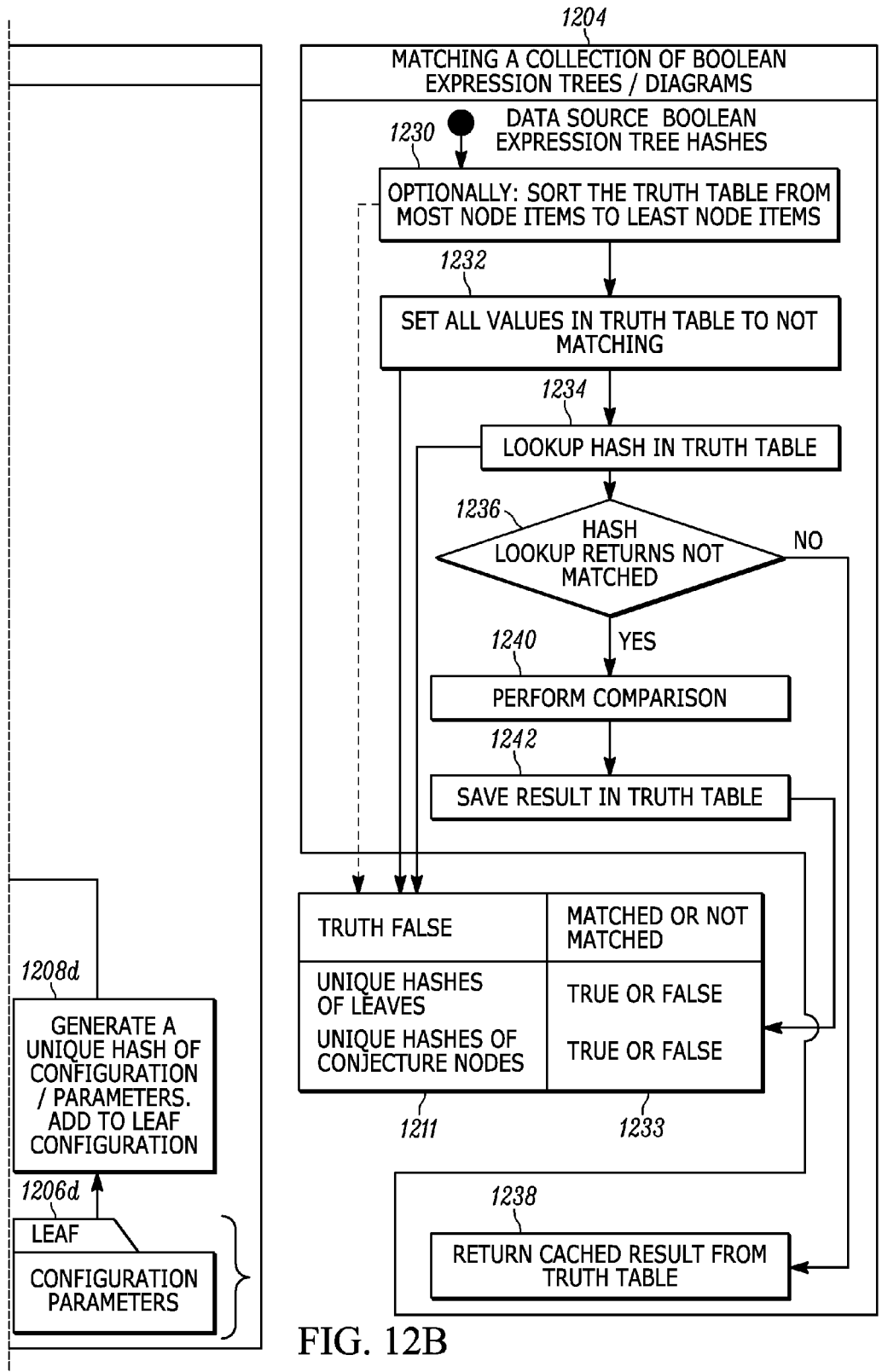

As another part of the event correlation process (or engine) 210 shown in FIG. 2, another process may effected according to the present disclosure when performing correlation. This methodology involves caching or storing execution results when comparing a collection of Boolean Expression tree and expression diagrams. This process 1200 may be seen in the example of FIGS. 12A and 12B. Process 1200 involves two subprocesses; a process 1202 for creating a Boolean expression tree, and process 1024 for matching a collection of Boolean expression tree hashes. The method 1200 effects a cross relation analysis among commonalities within Boolean expression trees that is used for caching. This type of analysis provides a caching advantage when comparing similar scores, resulting in more matches of a single entry to multiple expression trees per second. For example, if two Boolean expression trees have the same comparison of "blocked =success", only one comparison is necessary, and the single comparison result is cached.

In process 1202, in particular, a Boolean expression tree is iteratively created starting from a bottom left leaf node 1206*a* first (where a leaf node or external node is a node of the expression tree data structure having no child nodes), processing all leafs (e.g., 1206*a*, 1206*b*, 1206*c*, 1206*d*, etc.) first, before processing any conjecture nodes, where a conjecture node is a node that represents an "AND" or "OR" operator and contains children nodes of leaf comparisons or additional conjecture operators. It is noted that each of the leaf nodes may include various configuration options and other parameters.

For each leaf 1206 processed, a unique hash is generated based on the configuration options and/or other parameters (e.g., generating a hash with a hash function to map the data for storage and retrieval), and then assign it to the node as illustrated by blocks 1208*a*, 1208*b*, 1208*c*, and 1208*d*. This hash can be used to represent a consistency state, and can be examined or compared for determining the occurrence of change. It is noted that it would be expected that of two nodes have the exact same comparison configuration options, the hash based on these same options will be the same. As illustrated in blocks 1210*a*, 1210*b*, 1210*c*, and 1210*d*, the hashes generated in blocks 1208 may then be inserted or stored in a truth table 1211.

After processing of the leaf nodes, the Boolean expression tree creation involves processing conjecture nodes, such as "AND" and "OR" nodes. As may be seen in FIG. 12A, the illustrated example shows an AND node 1212 and an OR node 1214. It is noted that although the progression shown illustrates one input to the AND node 1212 and multiple inputs to the OR node 1214, the method 1200 is not limited to such, and various different configurations for processing the conjecture nodes is contemplated and different numbers of children leaves.

After the processing at conjecture nodes 1212 and/or 1214, hashes of the respective conjecture nodes and all children leaves are generated as illustrated by respective blocks 1216 and 1218 and added to the conjecture node configuration. The resultant hashes are tagged to the associated conjecture or leaf element through the associative array; namely truth table as seen in 1211.

Next in the iterative process of 1202, another conjecture node, shown by the exemplary "AND" node 1224, is processed. A final unique hash is then generated of all the conjecture nodes and all the children leaves as shown in block 1226. This hash is then tagged to the entire Boolean expression tree.

The unique hashes of the leaves and the conjecture nodes in truth table 1211 resultant from the process 1202 represent consistency states, and can be compared for change as mentioned before. It is also noted that an additional pass through each node also allows the detection of duplicate sections within a single expression tree, and affords the ability to remove duplicates, thus converting the expression tree to an expression diagram (i.e., inter-related destination conclusions).

The process 1204 provides matching of a collection of Boolean Expression Trees/Diagrams. As a preface, the method 1204 may include an optional sorting of the truth table from most node items to least node items as indicated by block 1230. Sorting the collection from most node items to least node items allows for more complex trees to be matched first, which helps build the cache in a more optimal manner.

After receiving a data source (i.e., a Boolean Expression Tree hash(es)), process 1204 then involves first initializing or setting values in the truth or hash table 1211 for each of the hashes with a value indicating it has not been matched, as shown in block 1232, and also illustrated by column 1233 in the hash table. Each value represents a hash found in the collection of Boolean expression trees For each Boolean expression tree when comparing nodes, process 1204 involves looking up the hash stored in the truth table first before performing the comparison as indicated by block 1234. Flow then proceeds to decision block 1236 to determine if the data source entry matches hashes looked up from the truth or hash table 1211. If not, flow proceeds to block 1238 where the cached result looked up from the truth or hash table 1211 is returned unchanged (e.g., a "not matched" state) and re-running of the comparison is avoided. On the other hand, if there is a match as determined in block 1236, a comparison analysis is performed at block 1240. The result of the comparison analysis is then saved in truth table 1211 as shown at block 1242.

As yet another part of the event correlation process (or engine) 210 shown in FIG. 2, another process may effected according to the present disclosure when performing correlation. This methodology 1300 illustrated in FIG. 13 involves the use of a Hyper-LogLog algorithm applied to stream data analysis as it relates to events and logs. According to an aspect, this method 1300 may be utilized within the comparison function discussed above in connection with Boolean Expression Tree in the examples of FIGS. 10-12. In an aspect, a HyperLogLog Distinct Cardinality Analysis is performed for stream data with data synchronization.

Figure 13:
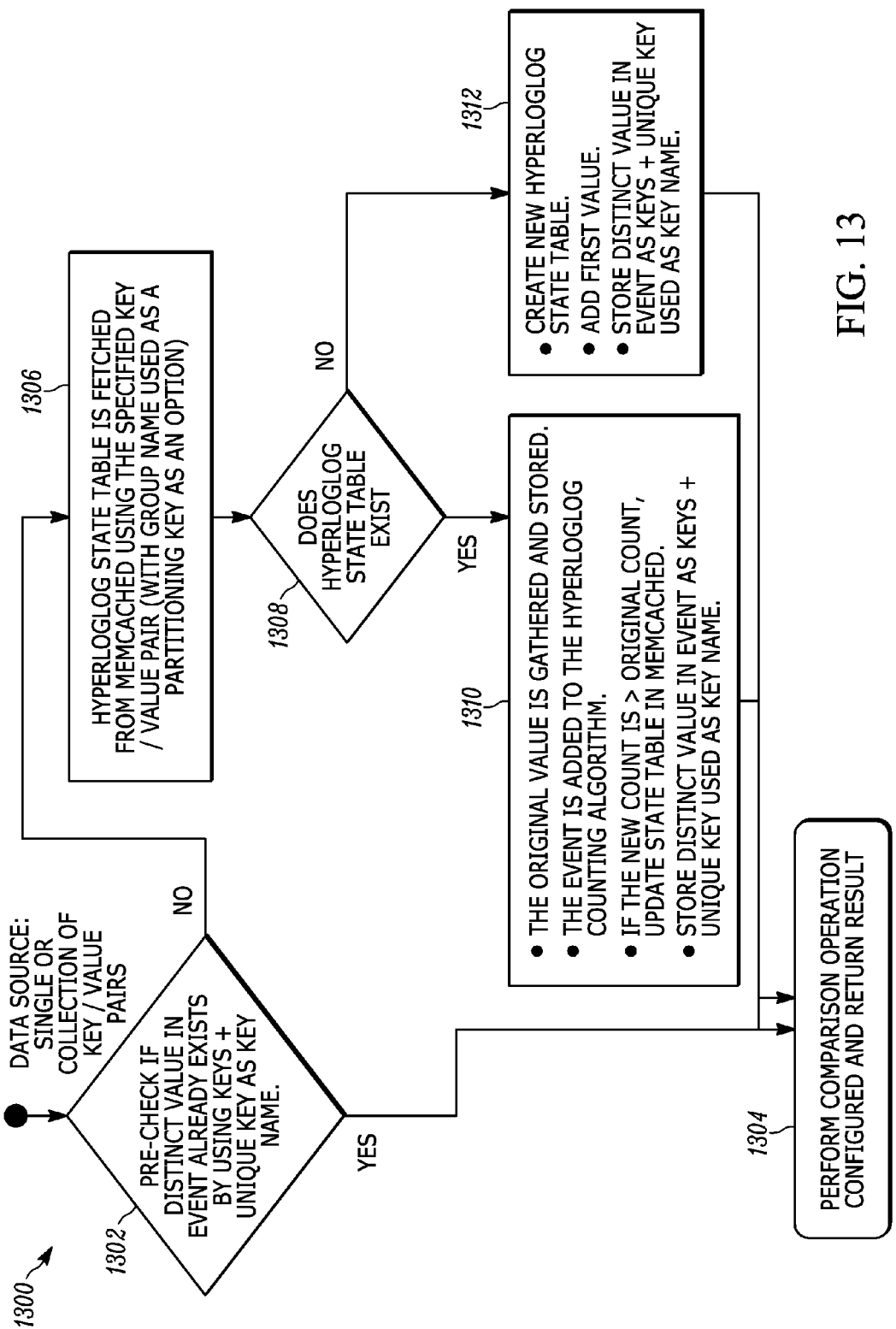
FIG. 13 illustrates a method for using Hyper-LogLog Distinct Cardinality Analysis for Stream Data with Data Synchronization.

As my be seen in FIG. 13, a data source is input to a first decision block 1302. The input may include one or more unique key-value pairs, such as those discussed earlier. For example, considering a configured unique key/value pair, the unique result is pulled from the event (e.g., a key-value pair IDS:127.0.0.1 would represents a class type IDS and host address 127.0.0.1). It is further noted that a user can configure distinct counting for any single or a collection of key-value pairs with a selected distinct counting key selected to make up the total unique key. For example, a key designated "ip_src", with a distinct count key of "ip_dport" will count how many unique destination ports per source IP address are within the stream.

The decision block 1302 is configured as a pre-check to determine if a distinct value in an event already exists by using keys+unique key as the key name. If the distinct value exists, this value is used to perform a comparison operation configuration and returns this result, as illustrated by block 1304.

Alternatively at block 1302, if the distinct value does not exist, flow proceeds to block 1306 where a HyperLogLog state table if fetched from the Memcached data using the specified key-value pair (with group name used as a partitioning key as an option). Next, flow proceeds to decision block 1308 to determine if the HyperLogLog state table exists: If it does, then flow proceeds to process 1310 where the original value is gathered and stored, and the event value (e.g., ip_dport) is added to the HyperLogLog counting algorithm. The process of block 1310 may also include a determination whether the new count is greater than an original count, and may accordingly update the state table in Memcached data. Additionally, the distinct value is stored in the event as keys+unique key used as the key name.

If the HyperLogLog does not exist, as determined at block 1308, flow proceeds to block 1312 where a new table is created and a first value is added thereto. Additionally, the distinct value is then stored in an event as keys+unique key used as key name.

After either process 1310 or 1312, flow proceeds to block 1304 where the comparison operation configuration is performed and the result returned. The result of the method 1300 affords detection of anomalies based upon Boolean rules, such as any username being used where the distinct IP source is not a unitary or singular value such as 1, which would indicate that a username is being used by more than one source host, for example.

Figure 14A:
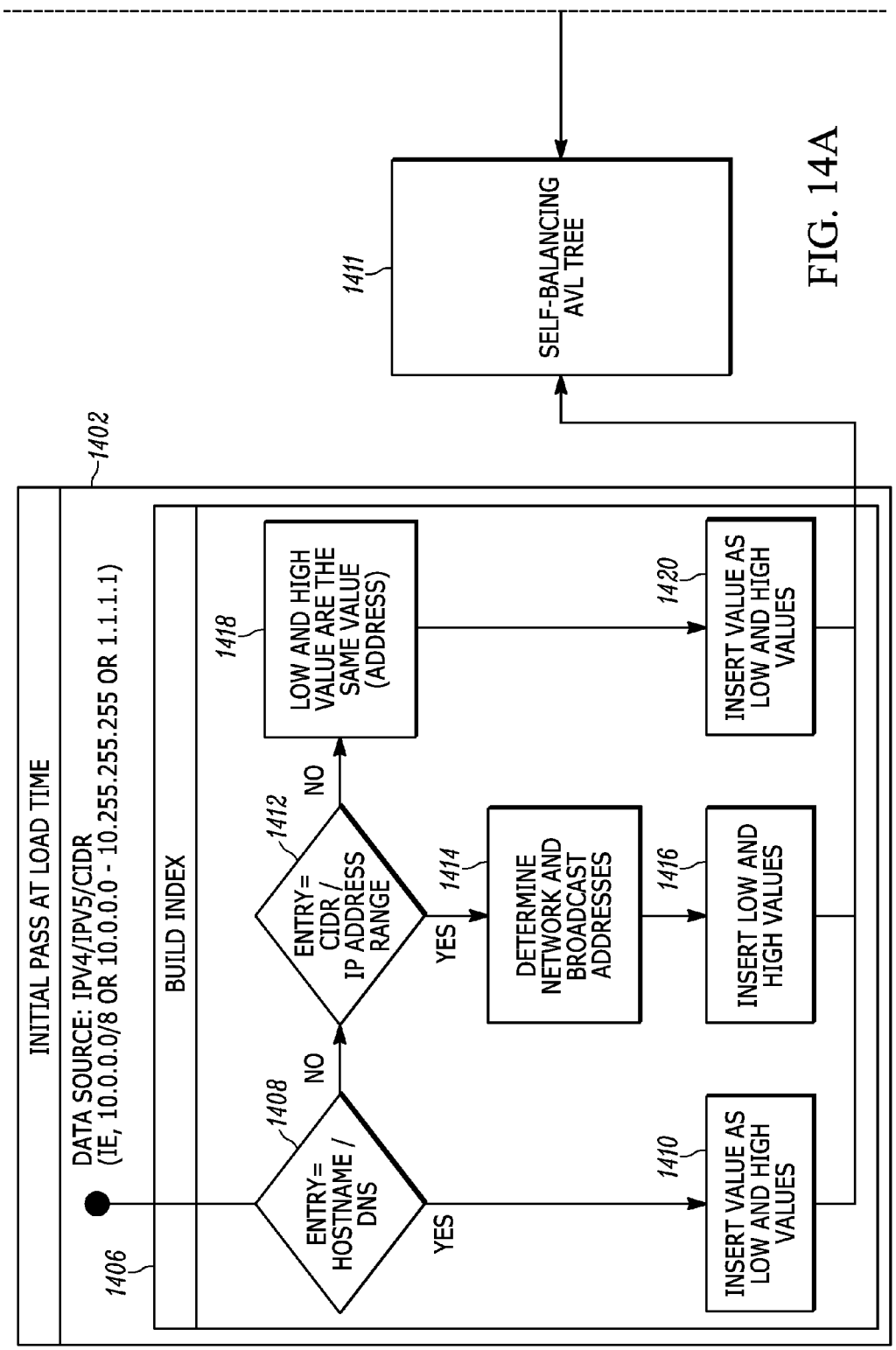
FIGS. 14A and 14B illustrate a method for using Balanced AVL Tree for complex IPv4/IPv6/CIDR notation comparison.
Figure 14B:
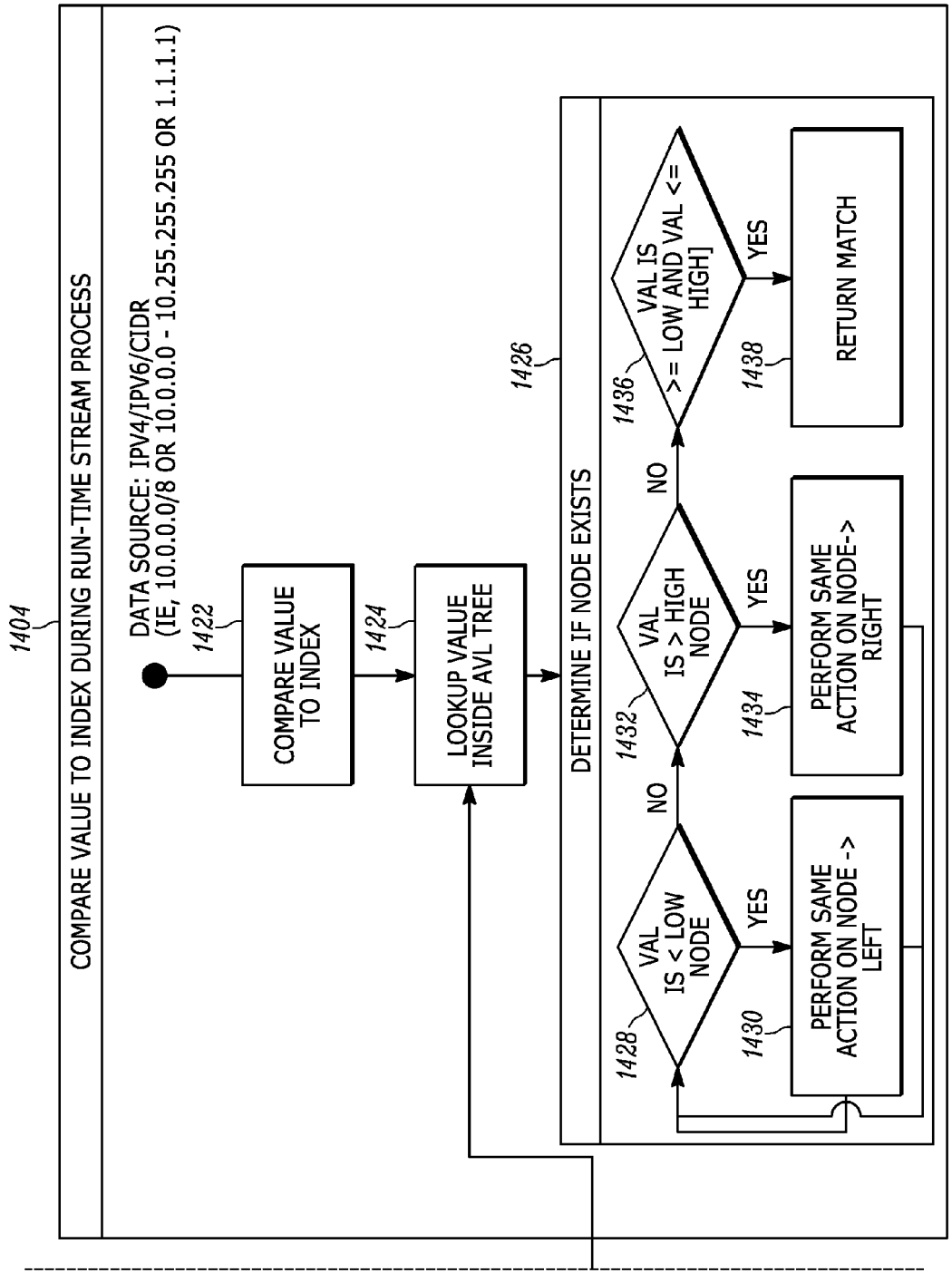

According to another aspect, a method for using a balanced Adelson-Velsky and Landis (AVL) tree can be utilized for complex IPv4/IPv6/Classless Inter-Domain Routing (CIDR) notation comparisons. This methodology may be implemented at event correlation block 210 in FIG. 2, for example. FIGS. 14A and 14B illustrate an exemplary method 1400 for using a balanced AVL tree for notation comparison. The AVL trees are balanced on insert/build time, which ensures lookups are always O(log n) (optimal), where n is the number of nodes in the tree prior to the operation. A CIDR Tree comparison handler utilizes a low and high 64 bit unsigned integer for range comparison, wherein the comparison value is the numeric representation of the network address (low, high, or both) (i.e., 10.0.0.0/ 8->10.0.0.0-10.255.255.255, or 1.1.1.1 as a single entity). These values are also used for tree lookup ordering (left/ right node lookups).

Turning to FIG. 14A, the method 1400 includes a first initial pass process 1402, which is executed at a load time for each entry, and a compare value to index process 1404 executed during a run-time stream process. Process 1402 receives an input data source, such as an IPv4, IPv6, or CIDR notation (e.g., 10.0.0.0/8 OR 10.0.0.0-10.255.255.255 OR 1.1.1.1). Process 1402 further includes a build index process 1406 used to build the AVL tree run at load time. Process 1406 includes a first decision block 1408 determined for each entry whether the entry is equal to a hostname/DNS (Domain Name system) entry. If the entry is equal, flow proceeds to block 1410 where the value is inserted into the AVL tree (e.g., a self-balancing AVL tree as shown by block 1411) as low and high values.

Alternatively at block 1408, if the entry is not equal to the Hostname/DNS, then a determination is made whether the entry is equal to or within a CIDR/IP address range, as illustrated by decision block 1412. If so, then the process 1406 includes a process 1414 to determine and assign low and high values (i.e., network and broadcast addresses), and then inserting these values to the AVL tree 1411 as shown by block 1416.

If the entry is not determined in the CIDR/IP address range, flow proceeds from decision block 1412 to decision block 1418. Here, the low and high value are determined to be the same value (i.e., address). It is then these values that are inserted into the AVL tree 1411 as the low and high values as illustrated by block 1420.

The compare process 1404 shown in FIG. 14B is executed during run-time stream process. Again, a data source is input to the process 1404, such as an IPv4, IPv6, or CIDR value (e.g., 10.0.0.0/8 OR 10.0.0.0-10.255.255.255 OR 1.1.1.1). The input value is compared to an index value, as illustrated at block 1422. Next process 1404 includes a lookup process 1424 wherein the value is looked up in the AVL tree 1411. If the node exists, as determined in block 1426, the lookup will return a true value, and if not returns a false.

If the value is true (i.e., the node exists), then a determination is made whether the value is less than a low node at block 1428. If the value is less, then flow proceeds to block 1430 to perform a same action on node to the left. If the value is not less than the low node, flow proceeds to decision block 1432 where it determined if the value is greater than the high node. If so, then a same action is performed on nodes to the right as indicated in block 1434.

Alternatively at block 1432, if the value is not less than the high node, flow proceeds to decision block 1436 where a determination is made to then check whether the value is greater than or equal to the low node and less than or equal to the high node. If these conditions are met, then a match is returned at block 1438. The end result yields a value that affords a more optimal and faster lookup within this index.

Figure 15A:
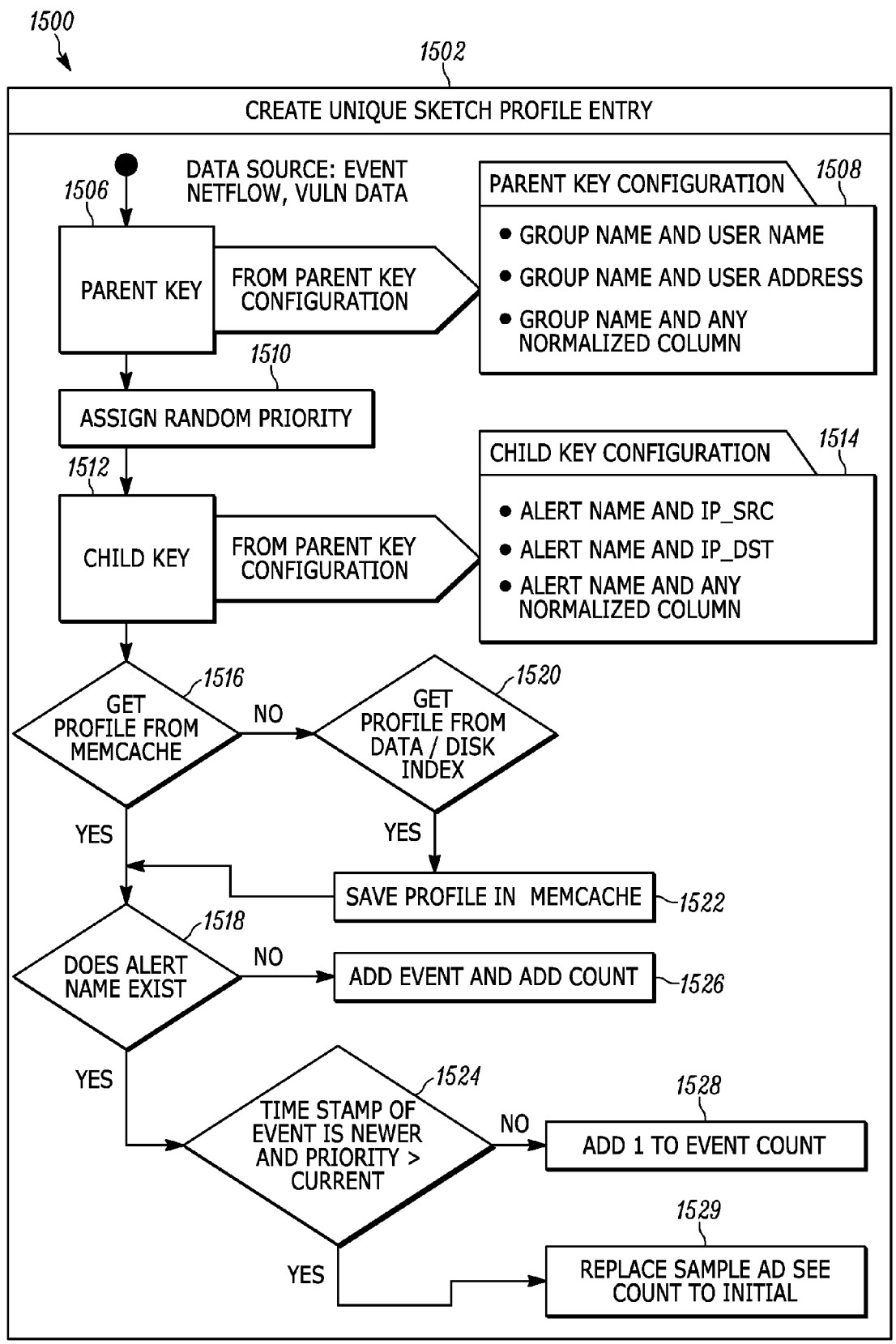
FIGS. 15A and 15B illustrate a method for building Sketch/Sample profiles from customizable indexes.
Figure 15B:
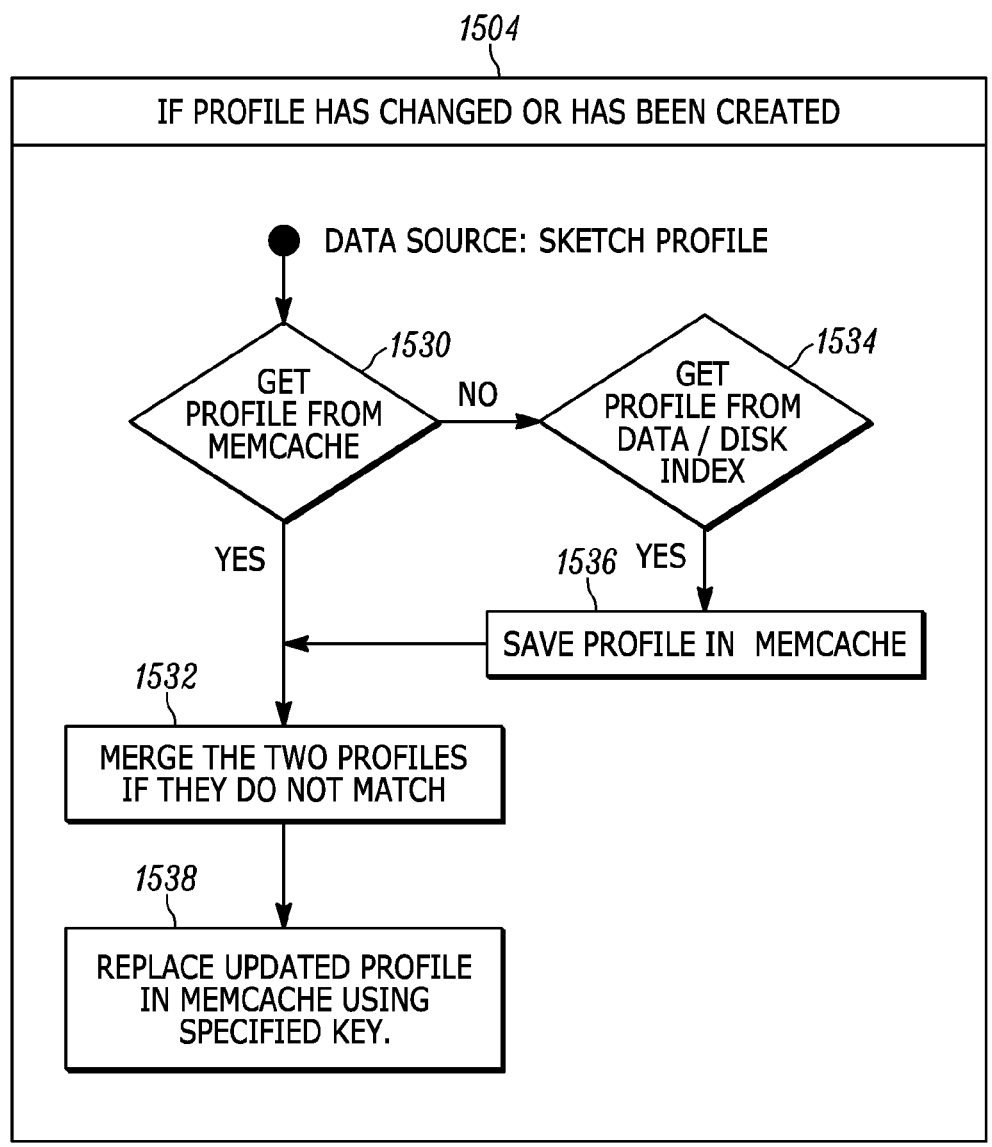

According to another aspect, the correlation engine block 210 may further implement a method 1500 for building sketch/sample profiles from customizable indexes as illustrated in FIGS. 15A and 15B. In particular, this method affords generation or building of a unique lookup key from an index and data source (e.g., an event, netflow, vulnerable data, etc.). Method 1500 is illustrated as having a process 1502 for creating the unique sketch profile entries, and a process 1504 for determining if a sketch profile has been changed or created, and subsequent updating due to the change or creation.

The method 1502 involves first receiving a data source (e.g., an event, netflow, vulnerable data, etc.) to create each unique sketch for a profile configuration entry. First a parent or primary key is determined as indicated at block 1506. For the particular data source entry, the parent key configuration is determined, such as a Group name AND Username; a Group Name AND Address; or a Group Name AND any normalized column, as shown by table 1508. After the parent key configuration is determined, a random priority is assigned to the event as indicated in block 1510. Next a sample extract or configuration based upon secondary child keyset is determined or obtained as seen by block 1512. The child key configuration may include an Alert Name AND an IP_SRC; an Alert Name and IP_DST; or an Alert Name and RESOURCE_ADDR, as examples illustrated in table 1514.

Next, a retrieval of a profile from Memcached is attempted and a determination made whether the profile is in Memcached as illustrated by decision block 1516. If the profile exists, flow proceeds to block 1518. However, if the profile is not extant, flow proceeds to block 1520 read the profile from data/disk index and then save the profile in Memcached (block 1522).

At block 1518, a determination is made whether the Alert name exists. If it does not, flow proceeds to block 1526 where the event is added and a count is added as well. On the other hand, if the Alert Name does exist, flow proceeds to block 1524 where a determination is made whether a timestamp of the event is newer AND the priority is greater than a current priority, as seen in decision block 1524. If not, flow proceeds to block 1528 where one is added to the event count. Alternatively, if the conditions of block 1524 are met, then the sample is replaced and the count is reset or set to an initialized value as shown in block 1529.

Turning to process 1504, this process is used for determining if a sketch profile has and/or if a sketch profile has been created. Here the input data source is a retrieved sketch profile from Memcached based on the input sketch profile. If the sketch profile requested from Memcached does not exist as determined in block 1530, then flow proceeds to block 1534 where the profile is read from data/disk index and then saved in Memcached (block 1536) using the given key.

Next, a determination is made whether the two profiles match, if the two profiles do not match, and if not the profiles are merged as indicated in block 1532. Next, the profile in Memcached is replaced with an updated profile using the specified key as illustrated by block 1538. The replaced profile (or the merged profile from the process of block 1532) in the local and remote key/value storage engine is then specified in profile configuration (i.e., index name).

The process 1500 allows for multiple options but the same sketch index file to merge the results: i.e., Alert_Name, IP_SRC; Alert_Name, IP_DST; Alert_Name, Resource_Addr, and the like. Additionally, the method 1500 can include an option to purge samples within the sketch older than a predetermined "x" time period (which could specified in various units of time such as days, etc.), thereby trimming the sketch to only contain the most recent data. Furthermore, there may be an option to create multiple sketch profiles per unique key (e.g., four profiles per unique key such as: one for a Weekday where time is sunlight; one for Weekday where time is night light; one for Weekend where time is sunlight, and one for Weekend where time is night light).

Additionally, another option may be to store numeric representations of the given event data, rather than the original value. This would provide the same matching cases, using a hashing algorithm, but only store the hashes of the data, not the actual data itself. This feature reduces the size of the profile storage in memory and disk.

Synchronization of these profiles can be done using Memcached using a maintenance thread that periodically runs and stores/updates the existing profiles using the given index.

Figure 16:
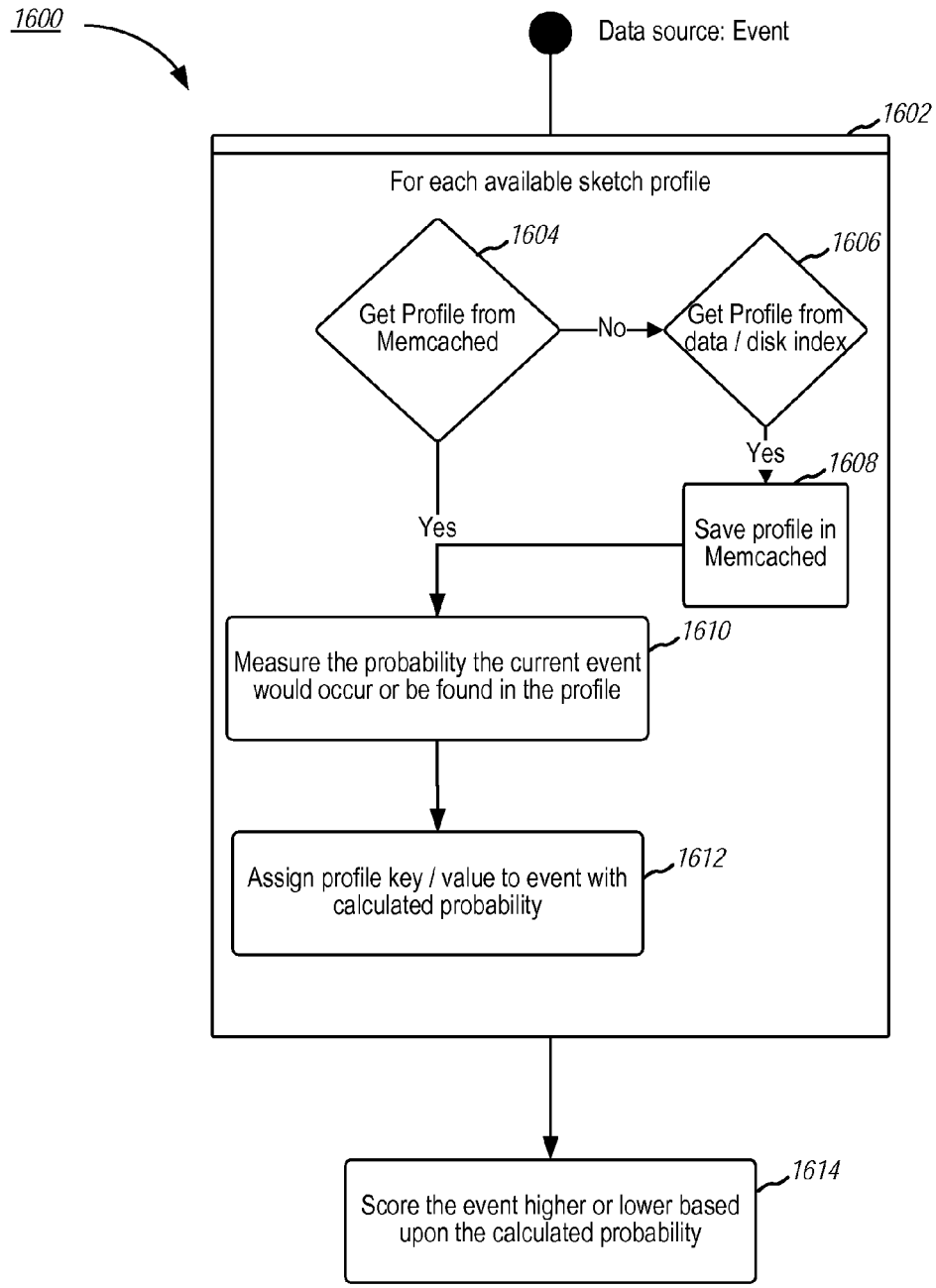
FIG. 16 illustrates a method for Change Detection (Anomaly) utilizing Sketch/Sample Profile Comparisons.

According to another aspect, the correlation engine block 210 may further implement a method 1600 as illustrated in FIG. 16 for detecting changes (e.g., Anomalies) by using the sketch/sample profiles in a comparison operation. Anomaly detection in this manner may be advantageously leveraged for log/event data.

As illustrated in method 1600, the input data source may be a particular event. Method 1600 includes a process 1602 for processing the event for each available sketch/profile index. In particular, process 1602 includes obtaining a profile from Memcached. If the profile does not exist, the profile is obtained from a data/disk index (process 1606) and then the profile is saved in Memcached (process 1608).

Flow then proceed to block 1610 where the probability that the current event would occur or be found in the profile given the existing events already sampled/sketched is measured or calculated. This process, which is a type of forecast algorithm, may be implemented according to any one of several methods, such as autoregressive integrated moving average (ARIMA) or exponential smoothing such as Holt-Winters, as a couple of examples.

After calculating the probability in block 1610, a profile key/value is assigned to the event with a calculated probability as illustrated in block 1612.

Method 1600 then includes a scoring of the event based on the calculated probability as shown at block 1614. A Boolean rule/key may be used to score the event higher or lower, based upon the calculated probability. As merely one example, scoring could be implemented as such: if probability were greater than or equal to 90%, 2 points would be subtracted from the scoring, if the probability was less 50% and greater 20%, 2 points would be added, and if the probability was less than 20%, 4 points could be added.

Figure 17:
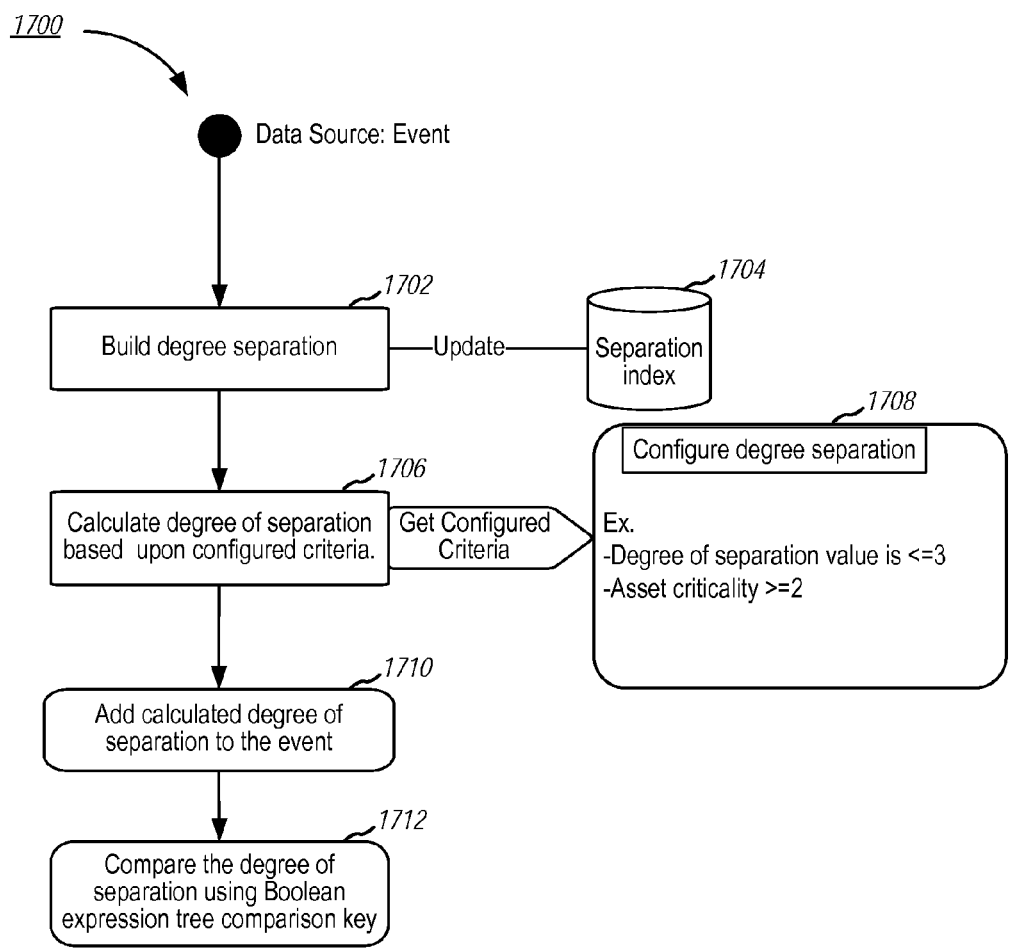
FIG. 17 shows an exemplary method for k-nearest neighbor indexing of sketch profiles.

In yet another aspect, the correlation engine block 210 may further implement a method 1700 as illustrated in FIG. 17 for indexing of sketch profiles using k-nearest neighbor indexing. Method 1700 allows the system specification of a threshold of degrees of separation based upon a given index. For example, if a username is used and IP source exists on a threat intelligence list or is malicious activity, and the username access is some known degree of separation from an asset where criticality is severe, the score can be adjusted accordingly. As a specific example, if an asset has a severe criticality of priority 1 and the degrees of separation value is less than or equal to 3, then the score would be adjusted higher because it may have a higher degree of impact if the attack were to be successful.

Turning to FIG. 17, as may be seen in block 1702, for each data source, which is each given event, a degree of separation is built or determined and then added or updated to a separation index 1704. Next, process 1700 involves calculating a degree of separation based upon configured degree separation criteria or rules as may be seen in block 1706. The configured degree of separation is shown in a table or storage 1708 accessed at process 1706. An exemplary configured degree of separation is shown where the degree of separation value will be less than or equal to three (3), and the asset criticality is greater than or equal to a value of two (2).

Figure 18:
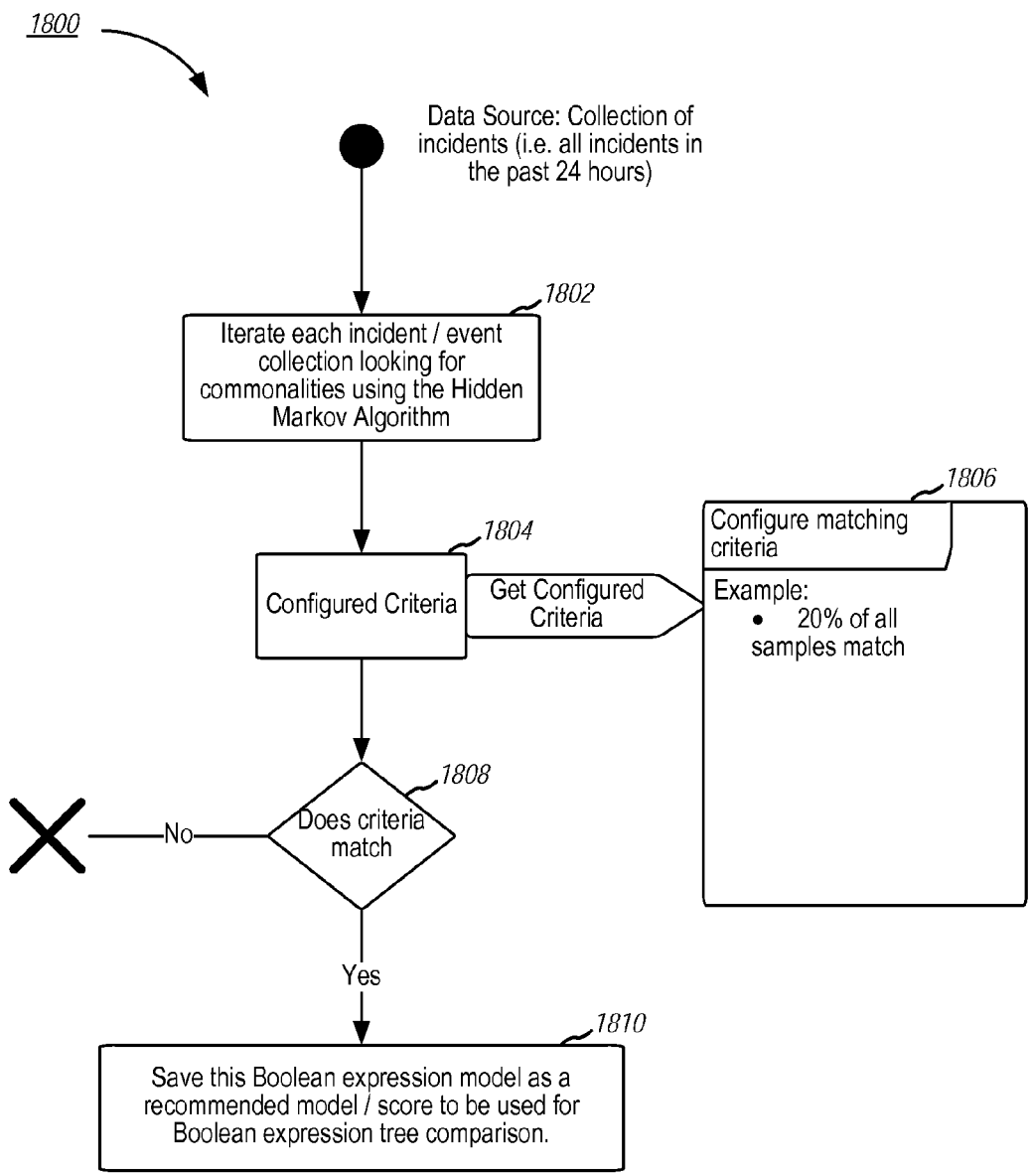
FIG. 18 illustrates a method for Decision Tree Learning and Association Rule Mining.
Figure 19:
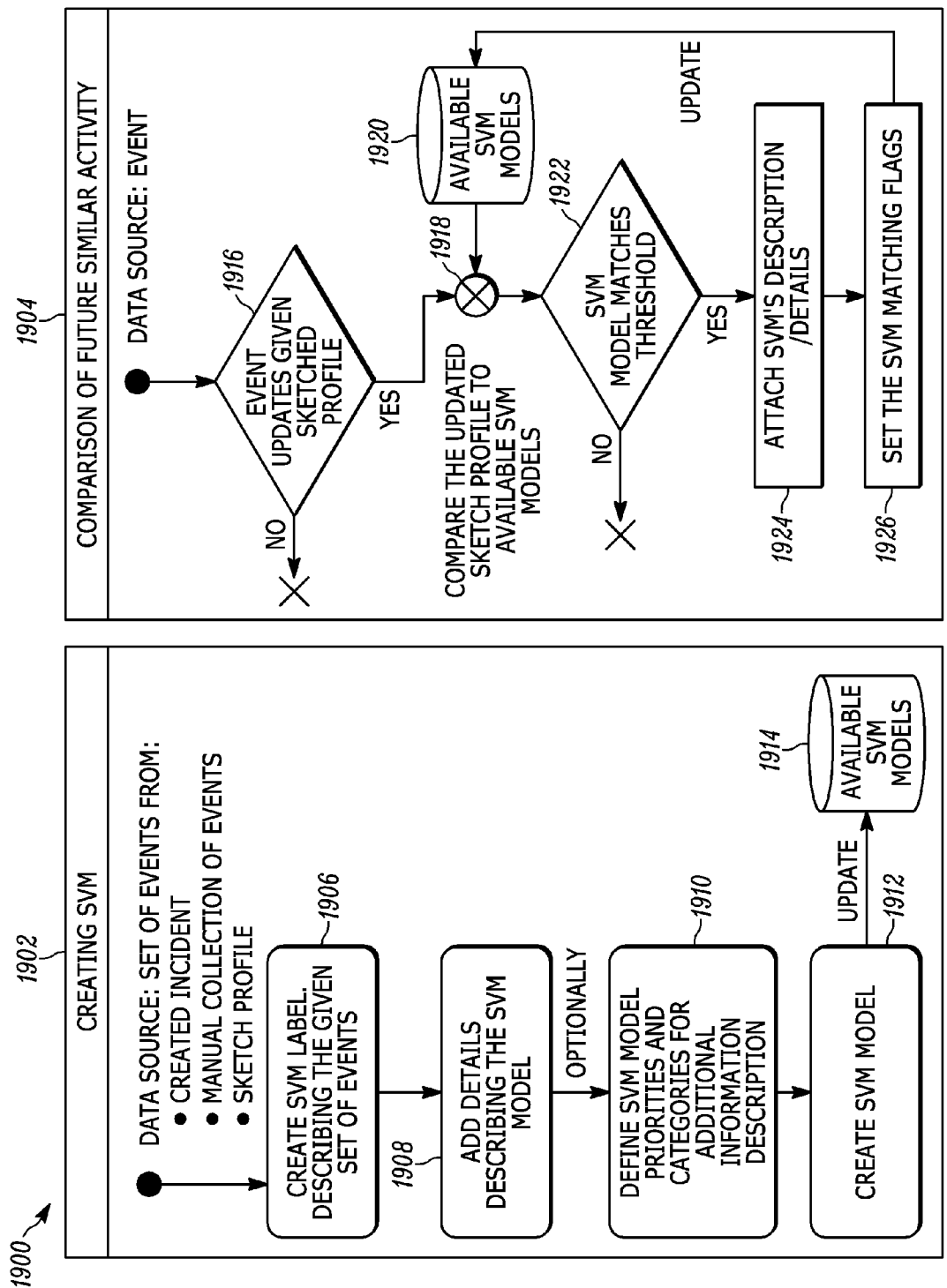
FIG. 19 illustrates a method for Support Vector Machine Learning of Event/Log Collections.

The degree of separation calculated at block 1706 is then added to the input event as shown at block 1710. Process 1700 then concludes with a comparing the degree of separation using a Boolean expression tree comparison key as indicated in Block 1712. In yet another aspect, the augmentation correlation engine block 210a may further implement a method 1800 as illustrated in FIG. 18 for effecting decision tree learning and associate rule mining for log analysis. In an aspect, this method may be run as a utility periodically in block 210a, and contribute to the overall process as outlined in FIG. 2.

Method 1800 includes first input from a data source; namely a given collection of incidents. For example, the collection of incidents could be a temporal collection, such as all incidents occurring in a time period, such as in the past 24 hours. The data source input is acted upon in block 1802 where an iteration of each incident in the event collection is performed, where the process of 1802 is effective for looking for commonalties using a Hidden Markov algorithm, for example. Next a configured criteria is determined at block 1804, wherein the configure matching criteria, as one example shown in 1806, is set. In an example, the criteria may be that 20% of all sample match. If a given model meets the configurable matching criteria (e.g., 20% of all samples) as determined in block 1808, then process 1800 saves this Boolean expression model as a recommended model/score to be used for Boolean expression tree comparison as indicated in block 1810.

Still another process according to an aspect may be effected by correlation engine Block 210. The process 1900 is a method for Support Vector Machine (SVM) learning of Event/Log collections such as an incident for comparison of future similar activity. In particular, the SVM learning method is being applied in block 210 for log analysis as it relates to pattern and state detection.

Method 1900 involves two processes; a process 1902 for creating the SVM models and process 1904 for future comparison of similar activity. In process 1902, the input data source is a given set of events, whether it be a created incident, a manual collection of events, or a sketch profile. From this input data source, an SVM label is created as indicated at block 1906, which describes a given set of events. For example, the SVM Label "XYZ" could be a label where XYZ describes the given set of events.

Next, details describing the SVM model, such as reference material, are added as illustrated in block 1908. Optionally, process 1902 may include a process 1910 for defining SVM model priorities and categories for additional information description. The SVM model is then created (block 1912) and updated to a storage of available SVM models (19140.

The process 1904 is a comparison of future similar activity that utilizes the stored SVM models for comparison. An input data source comprising an event is input to block 1916. Here, determination is made for each event where event updates the given sketched profile. The updated sketch profile is compared at block 1918 with the stored available SVM models within storage 1920 (which is the same as storage 1914 in process 1902, incidentally).

If, after the comparison, the SVM model matches a predetermined threshold as shown in block 1922, then process 1904 involves attaching SVM's description/details (block 1922), as well as setting SVM matching flags (block 1926).

Figure 20:
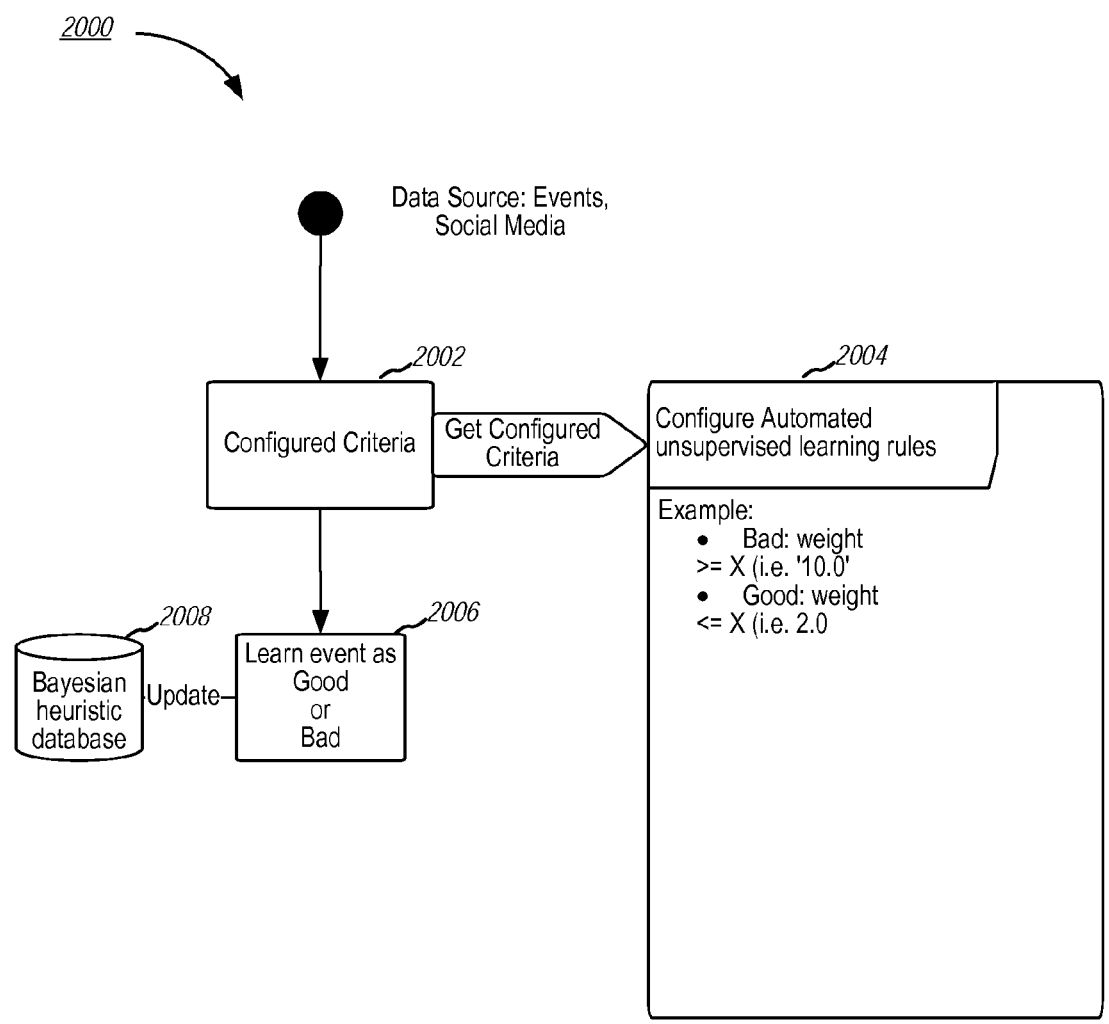
FIG. 20 illustrates a method for Unsupervised Learning Support for Training of Analytics.

Method 1900 can be configured such that it operates automatically to create SVM's from the given sketched profile Yet another method 2000 may be implemented by block 210a, the method illustrated in FIG. 20 and comprising a method for unsupervised learning support of the training of analytics for the purpose of log analysis The data source input includes events and social media data. At block 2002 a user can configure criteria; i.e., automated unsupervised learning rules, by setting specified search parameters, illustrated in table 2004. As an example of such rules, an event is designated as a "bad" event if a weight is set greater than or equal to a value X (e.g., 10.0). Conversely, an event is designated a "Good" event if a weight less than or equal to a value X (e.g., 2.0).

Accordingly, at block 2006, for each event that matches the given criteria, the event can be learned as good or bad, which of course is depending upon the matching criteria. Additionally, the Bayesian heuristic database (2008) may be updated with the learned event information.

According to another aspect, a method 2100 may be implemented in block 210a for Natural Language Processing (NLP) for stream analysis of Social Media and News Media feeds. It is noted that this may be different mode within the engine. Instead of typically analyzing streams of events, method 2100 analyzes streams of natural text language. At least a couple of applications for method 2100 are contemplated: (1) Feeding into any Structured Threat Information expression (STIX), Trusted Automated exchange of Indicator Information (TAXII), or Cyber Observable Expression (CybOX) compliant threat intelligence framework; and (2) automated "recommended" scores/Boolean expression trees to be proactive when detecting threats.

Figure 21:
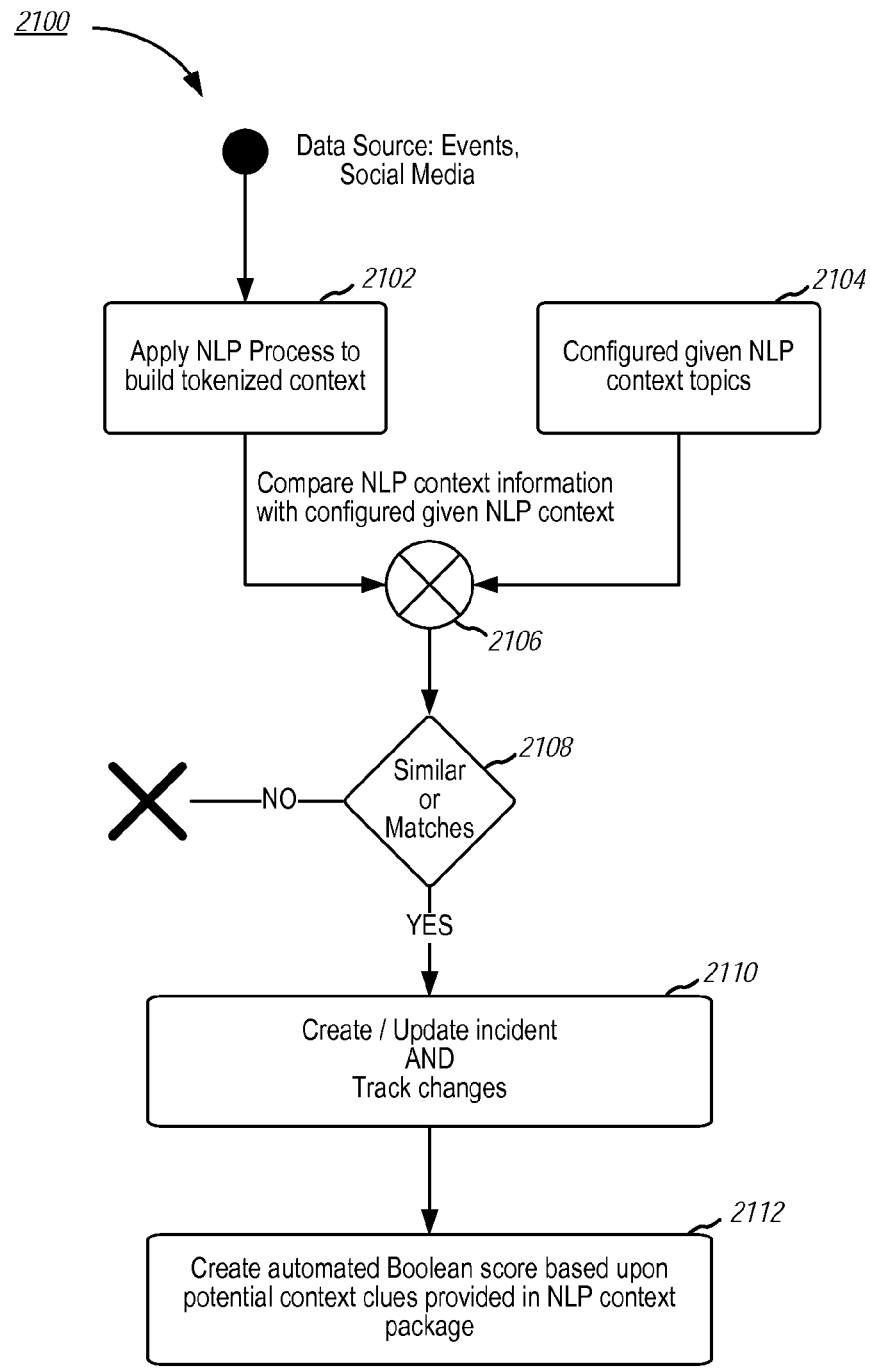
FIG. 21 illustrates a method for Natural Language Processing for Stream Analysis of Social Media and News Media feeds.

As may be seen in FIG. 21, the data source is input events and social media events. NLP processes are applied to the input events/social media events to build tokenized "context" to the given information, as shown by block 2102. Concurrently, given NLP context topics are configured as illustrated by block 2104. The NLP context information is then compared with configured given NLP context topics as shown at 2106 in order to monitor and detect similarity.

If the comparison at block 2106t yields similar or matching criteria as determined at block 2108, either the creation or update of the incident is effected, along with tracking of changes as illustrated at block 2110. Next, process 2100 involves creating an automated Boolean score based upon potential context clues provided in the NLP context package, as shown at block 2112. For example, if there is a Distributed Denial of Service (DDoS) attack threatened on all Healthcare Providers, the DDoS Attack is the "what" or "how", and Healthcare Providers are the "who," as well as the source author.

Figure 22:
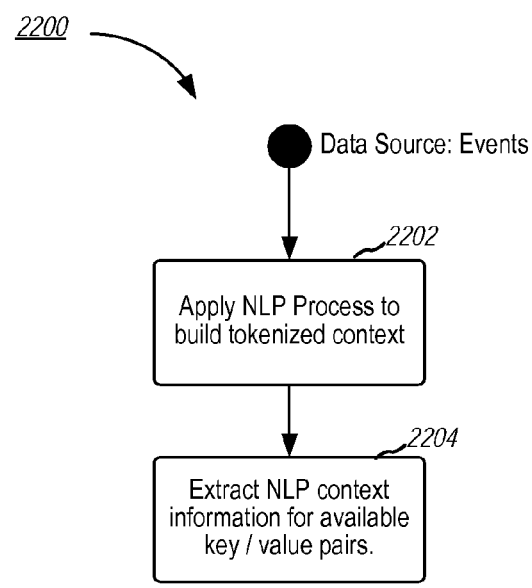
FIG. 22 illustrates a method for Natural Language Processing for Advanced and Automated Log Normalization.

Within the normalization process (i.e., block 206 in FIG. 2), a further methodology 2200 shown in FIG. 22 may be implemented to further enhance the normalization processing. Method 2200, in particular, is a method for NLP for advanced and automated Log Normalization. Method 2200 receives as the data source input events (i.e., the log events). NLP processes are applied to the input events to build tokenized "context" to the given information as shown in block 2202. Next, NLP context information for available key/value pairs is then extracted.

In light of the foregoing, apparatus and methods are provided by which to facilitate analysis of events that are related to a network system across multiple network or computer systems.

Those of skill will further appreciate that the various illustrative logical blocks, modules, circuits, and algorithm steps described in connection with the embodiments disclosed herein may be implemented as computer software, as well as hardware or logic, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module or API executed by a processor, or combinations thereof. A software module may reside in RAM memory, flash memory, ROM memory, EPROM memory, EEPROM memory, registers, hard disk, a removable disk, a CD-ROM, or any other form of storage medium or computer program product known in the art. An exemplary storage medium or computer program product may be coupled to the processor such the processor can read information from, and write information to, the storage medium. The storage medium, computer-readable medium, or computer program product is fixed and non-transitory, and is configured to include or store code or programming instructions that, when executed by a processor or computer, effect the methods or algorithms disclosed herein.

The word "exemplary" is used herein to mean "serving as an example, instance, or illustration." Any embodiment described herein as "exemplary" is not necessarily to be construed as preferred or advantageous over other embodiments. Additionally, the previous descriptions are of preferred examples for implementing the presently disclosed methods and apparatus, and the scope thereof should not necessarily be limited by this description. The scope of the present invention is defined by the following claims.

What is claimed is:

1. A method for use in analyzing system events for one or more network systems or computer systems, the method comprising:

identifying system-event data resulting from system or network events occurring on one or more computer systems that match at least one event rule of an event-rule set in the one or more computer systems or network systems;

normalizing the identified system-event data; and analyzing the system-event data including at least one of:
  determining comparison matching of rules pertaining to the system-event data;
  using at least a scoring rule of a scoring-rule configured to assign a score to the system-event data, wherein the score is operable for prioritizing system-event data; and
  performing data measurements based on the system-event data.

2. The method as defined in claim 1, wherein analyzing the system-event data further comprises:
  generating a matching array having labels assigned for one or more nodes in a Boolean expression tree used for Boolean rule matching; and
  determining whether at least one score matches a rule based on analyzing intervals of the matching array.

3. The method as defined in claim 1, wherein analyzing the system-event data further comprises:
  reducing a plurality of Boolean expression trees used for Boolean rule matching using a cross relation analysis to remove duplications;
  generating a unique hash for each of the plurality of Boolean expression trees representing the Boolean expression tree;
  comparing whether the generated hashes match predetermined rules; and
  caching the comparison results.

4. The method as defined in claim 1, wherein analyzing the system-event data further comprises:
  determining one or more key-value pairs;
  assigning a distinct counting for each key-value pair to thereby configure a respective unique key-value pair;
  determining for each configured unique key-value pair, if a distinct event value associated with the unique key-value pair exists in a database;
  using the distinct event value for comparison if the key-value is determined to already exist; and
  accessing a cached HyperLogLog state table if the distinct event value does not exist to perform a HyperLogLog operation if the state table exists for updating the table or creating a new HyperLogLog table if a cached table did not exist; and
  perform a comparison operation on the key-value.

5. The method as defined in claim 1, wherein analyzing the system-event data further comprises:
  building a balanced AVL tree configured for at least one of IPv4, IPv6, or CIDR address notation comparison, the AVL tree comprising a plurality of nodes having respective index values based on the input addresses;
  comparing values comprising at least one of an IPv4, IPv6, or CIDR address input during a run-time stream process to respective index values in the AVL tree to determine whether a match exists.

6. The method as defined in claim 1, wherein analyzing the system-event data further comprises:
  building at least one unique sketch profile for at least one input data source including at least one of an event, a netflow, or vulnerability data; and
  caching the at least one unique sketch profile in a distributed cache.

7. The method as defined in claim 6, further comprising:
  comparing the least one unique sketch profile cached in the distributed cache with a current input data source to determine whether a match exists there between; and
  merging the input data source and the cached at least one unique sketch profile in the distributed cache when a match does not exist.

8. The method as defined in claim 1 wherein, analyzing the system-event data further comprises:
  accessing a sketch/profile index stored in a distributed cache;
  determining, for a given current input system event data, a probability that the current event data would occur in the accessed sketch/profile index given the existing events already sampled/sketched in creating the sketch/profile index;
  assigning a profile key/value to the given current system event data with the determined probability.

9. The method of claim 1, wherein a Boolean rule/key used to score the current system event data, scores the data based at least in part upon the determined probability.

10. The method as defined in claim 1, wherein analyzing the system-event data further comprises:
  applying a further analysis in conjunction with the analysis of the system-event data, the further analysis comprising:
    iterating each incident or event in a given collection of incidents using a predetermined statistical model;
    determining commonalities in the collection of incidents based on the iteration; and
    if the commonalities meet a preconfigured matching criteria, saving the model as a Boolean expression model as a recommended model to be used for Boolean expression tree comparison during correlation.

11. The method as defined in claim 1, wherein analyzing the system-event data further comprises:
  creating at least one support vector machine (SVM) model based on a given set of system-event data;
  determining for each event in the set where event updates a given sketch profile;
  comparing the updated sketch to the at least one SVM model;
  attaching SVM details and setting SVM flags if the comparison matches a predetermined threshold.

12. The method as defined in claim 1, wherein analyzing the system-event data further comprises:
  applying a further analysis in conjunction with the analysis of the system-event data, the further analysis comprising:
    configuring at least one automated unsupervised learning rule by setting specified search parameters;
    determining whether the system-event data matches the specified search parameters;
    learning the event as good or bad based on the at least one automated unsupervised learning rule; and
    updating a database based on the learned event.

13. The method as defined in claim 1, wherein analyzing the system-event data further comprises:
  applying an analysis in conjunction with the correlation, the analysis comprising:
    applying a Natural Language Processing (NLP) process to build context information related to input data including events and social media data;
    comparing the NLP context information with one or more preconfigured NLP context topics configured for monitoring and detecting similarity;

creating or updating incident and track changes if the comparison shows similarity, and an automated Boolean score based upon potential context clues provided in NLP context information.

14. The method as defined in claim 1, the normalization further comprising:
applying a Natural Language Processing (NLP) process to build context information concerning at least one input system log event; and
extracting the NLP context information for application to an available key-value pair.

15. The method as defined in claim 1, further comprising:
building at least one of user and network profiles based on logged event-system data.

16. An apparatus for use in analyzing system events for one or more network systems or computer systems, the apparatus comprising:
an event matcher configured to identify system-event data resulting from system or network events occurring on one or more computer systems that match at least one event rule of an event-rule set in the one or more computer systems or network systems;
a normalizer configured to normalize the identified system-event data; and
an event comparison engine configured to analyze the system-event data through at least one of:
determining comparison matching of rules pertaining to the system-event data;
using at least a scoring rule of a scoring-rule configured to assign a score to the system-event data, wherein the score is operable for prioritizing system-event data; and
performing data measurements based on the system-event data.

17. A computer program product, comprising:
a non-transitory computer-readable medium comprising:
code for causing a computer to identify system-event data resulting from system or network events occurring on one or more computer systems that match at least one event rule of an event-rule set in the one or more computer systems;
code for causing a computer to normalize the identified system-event data; and
code for causing a computer to analyze the system-event data including at least one of:
determining comparison matching of rules pertaining to the system-event data;
using at least a scoring rule of a scoring-rule configured to assign a score to the system-event data, wherein the score is operable for prioritizing system-event data; and
performing data measurements based on the system-event data.

18. The computer program product as defined in claim 17, wherein the code for causing a computer to analyze the system-event data further comprises:
code for causing a computer to generate a matching array having labels assigned for one or more nodes in a Boolean expression tree used for Boolean rule matching; and
code for causing a computer to determine whether at least one score matches a rule based on analyzing intervals of the matching array.

19. The computer program product as defined in claim 17, wherein the code for causing a computer to analyze the system-event data further comprises:
code for causing a computer to reduce a plurality of Boolean expression trees used for Boolean rule matching using a cross relation analysis to remove duplications;
code for causing a computer to generate a unique hash for each of the plurality of Boolean expression trees representing the Boolean expression tree;
code for causing a computer to compare whether the generated hashes match predetermined rules; and
code for causing a computer to cache the comparison results.

20. The computer program product as defined in claim 17, further comprising:
code for causing a computer to build at least one of user and network profiles based on logged event-system data.

* * * * *